United States Patent
Kailasam et al.

(10) Patent No.: US 10,520,783 B2
(45) Date of Patent: Dec. 31, 2019

(54) MITIGATING DEFECTS IN AN ELECTROCHROMIC DEVICE UNDER A BUS BAR

(71) Applicant: View, Inc., Milpitas, CA (US)

(72) Inventors: Sridhar Karthik Kailasam, Fremont, CA (US); Dhairya Shrivastava, Los Altos, CA (US); Zhiwei Cai, Fremont, CA (US); Robert T. Rozbicki, Germantown, TN (US); Dane Thomas Gillaspie, Fremont, CA (US); Todd William Martin, Mountain View, CA (US); Anshu A. Pradhan, Collierville, TN (US); Ronald M. Parker, Olive Branch, MS (US)

(73) Assignee: View, Inc., Milpitas, CA (US)

( * ) Notice: Subject to any disclaimer, the term of this patent is extended or adjusted under 35 U.S.C. 154(b) by 44 days.

(21) Appl. No.: 15/537,370

(22) PCT Filed: Dec. 15, 2015

(86) PCT No.: PCT/US2015/065910
§ 371 (c)(1),
(2) Date: Jun. 16, 2017

(87) PCT Pub. No.: WO2016/100403
PCT Pub. Date: Jun. 23, 2016

(65) Prior Publication Data
US 2017/0371218 A1     Dec. 28, 2017

Related U.S. Application Data

(60) Provisional application No. 62/094,862, filed on Dec. 19, 2014.

(51) Int. Cl.
*G02F 1/153* (2006.01)

(52) U.S. Cl.
CPC ........ *G02F 1/153* (2013.01); *G02F 2201/508* (2013.01)

(58) Field of Classification Search
CPC .... G02F 1/15; G02F 1/163; G02F 2001/1555; G02F 2001/1552; G02F 2001/1557
(Continued)

(56) References Cited

U.S. PATENT DOCUMENTS 6,369,934 B1   4/2002 Bechinger et al.
8,270,059 B2   9/2012 Friedman et al.
(Continued)

FOREIGN PATENT DOCUMENTS

KR   10-2009-0039810   4/2009
TW      201225314 A    6/2012
(Continued)

OTHER PUBLICATIONS

Extended European Search Report dated Jun. 28, 2018 issued in EP Application No. 15870917.0.
(Continued)

*Primary Examiner* — Mahidere S Sahle
(74) *Attorney, Agent, or Firm* — Weaver Austin Villeneuve & Sampson LLP; Brian D. Griedel

(57) ABSTRACT

Methods are provided for fabricating electrochromic devices that mitigate formation of short circuits under a top bus bar without predetermining where top bus bars will be applied on the device. Devices fabricated using such methods may be deactivated under the top bus bar, or may include active material under the top bus bar. Methods of fabricating devices with active material under a top bus bar include depositing a modified top bus bar, fabricating self-healing layers in the electrochromic device, and modifying a top transparent conductive layer of the device prior to applying bus bars.

20 Claims, 11 Drawing Sheets

(58) Field of Classification Search
USPC .................................................. 359/265–275
See application file for complete search history.

(56) References Cited

U.S. PATENT DOCUMENTS

| | | | |
|---|---|---|---|
| 8,300,298 B2 | 10/2012 | Wang et al. | |
| 8,432,603 B2 | 4/2013 | Wang et al. | |
| 8,669,503 B2 | 3/2014 | Johnson et al. | |
| 8,711,465 B2 | 4/2014 | Bhatnagar et al. | |
| 8,764,951 B2 | 7/2014 | Wang et al. | |
| 8,764,952 B2 | 7/2014 | Sato et al. | |
| 9,007,674 B2 | 4/2015 | Kailasam et al. | |
| 9,261,751 B2 | 2/2016 | Pradhan et al. | |
| 9,454,053 B2 | 9/2016 | Strong et al. | |
| 9,482,921 B2 | 11/2016 | Lamine et al. | |
| 9,664,974 B2 | 5/2017 | Kozlowski et al. | |
| 9,958,750 B2 | 5/2018 | Parker et al. | |
| 2007/0097481 A1 | 5/2007 | Burdis et al. | |
| 2009/0284821 A1 | 11/2009 | Valentin et al. | |
| 2009/0323162 A1 | 12/2009 | Fanton et al. | |
| 2012/0194895 A1 | 8/2012 | Podbelski et al. | |
| 2012/0275008 A1* | 11/2012 | Pradhan ................ | G02F 1/1525 359/265 |
| 2013/0016417 A1 | 1/2013 | Veerasamy | |
| 2013/0271812 A1 | 10/2013 | Brown et al. | |
| 2014/0022621 A1 | 1/2014 | Kailasam et al. | |
| 2014/0182125 A1 | 7/2014 | Rozbicki et al. | |
| 2014/0253996 A1 | 9/2014 | Burdis et al. | |
| 2014/0340731 A1 | 11/2014 | Strong et al. | |
| 2016/0097960 A1* | 4/2016 | Dixit ..................... | G02F 1/153 359/275 |
| 2019/0079365 A1 | 3/2019 | Sarrach et al. | |
| 2019/0146295 A1 | 5/2019 | Parker et al. | |
| 2019/0171076 A1 | 6/2019 | Kailasam et al. | |

FOREIGN PATENT DOCUMENTS

| | | | | |
|---|---|---|---|---|
| WO | WO 2012/145702 A2 | 10/2012 | | |
| WO | WO 2013/003065 A2 | 1/2013 | | |
| WO | WO 2013/049379 A1 | 4/2013 | | |
| WO | WO 2013/090209 A1 | 6/2013 | | |
| WO | WO-2013090209 A1 * | 6/2013 | ............ | G02F 1/155 |
| WO | WO 2013/138535 A1 | 9/2013 | | |
| WO | WO 2015/100419 A1 | 7/2015 | | |
| WO | WO 2015/164179 A1 | 10/2015 | | |
| WO | WO 2015/168626 A1 | 11/2015 | | |
| WO | WO 2016/100403 | 6/2016 | | |
| WO | WO 2018/157057 A1 | 8/2018 | | |

OTHER PUBLICATIONS

European Office Action dated Feb. 26, 2019 issued in EP Application No. 15870917.0.
PCT International Preliminary Report on Patentability dated Jun. 29, 2017 issued in PCT Application No. PCT/US2015/065910.
PCT International Preliminary Report on Patentability dated Dec. 27, 2018 issued in PCT Application No. PCT/US2017/037552.
U.S. Appl. No. 12/336,466, filed Dec. 16, 2008, McMeeking.
U.S. Appl. No. 16/310,164, filed Dec. 14, 2018, Parker et al.
U.S. Appl. No. 16/249,822, filed Jan. 16, 2019, Kailasam et al.
U.S. Preliminary Amendment dated Feb. 8, 2019 in U.S. Appl. No. 16/249,822.
PCT International Search Report and Written Opinion dated May 19, 2016 issued in PCT/US2015/065910.
Gross et al., "Flash Lamp Annealing for Large Area Applications," The 10th International Conference on Coatings on Glass and Plastics, Dresden , Germany, (Jun. 2014), 1 page.
Duffer, "How to Prevent Glass Corrosion," PPG Industries, Inc., Glass Technical Document, Published Nov. 15, 1986, Revised Jan. 17, 2002, 8 pages.
PCT International Search Report and Written Opinion dated Sep. 27. 2017 issued in PCT/US2017/037552.
U.S. Appl. No. 16/453,891, filed Jun. 26, 2019, Kailasam et al.
U.S. Preliminary Amendment dated Jul. 16, 2019 in U.S. Appl. No. 16/453,891.
Taiwanese Office Action dated Sep. 20, 2019 issued in TW Application No. 104142808.

* cited by examiner

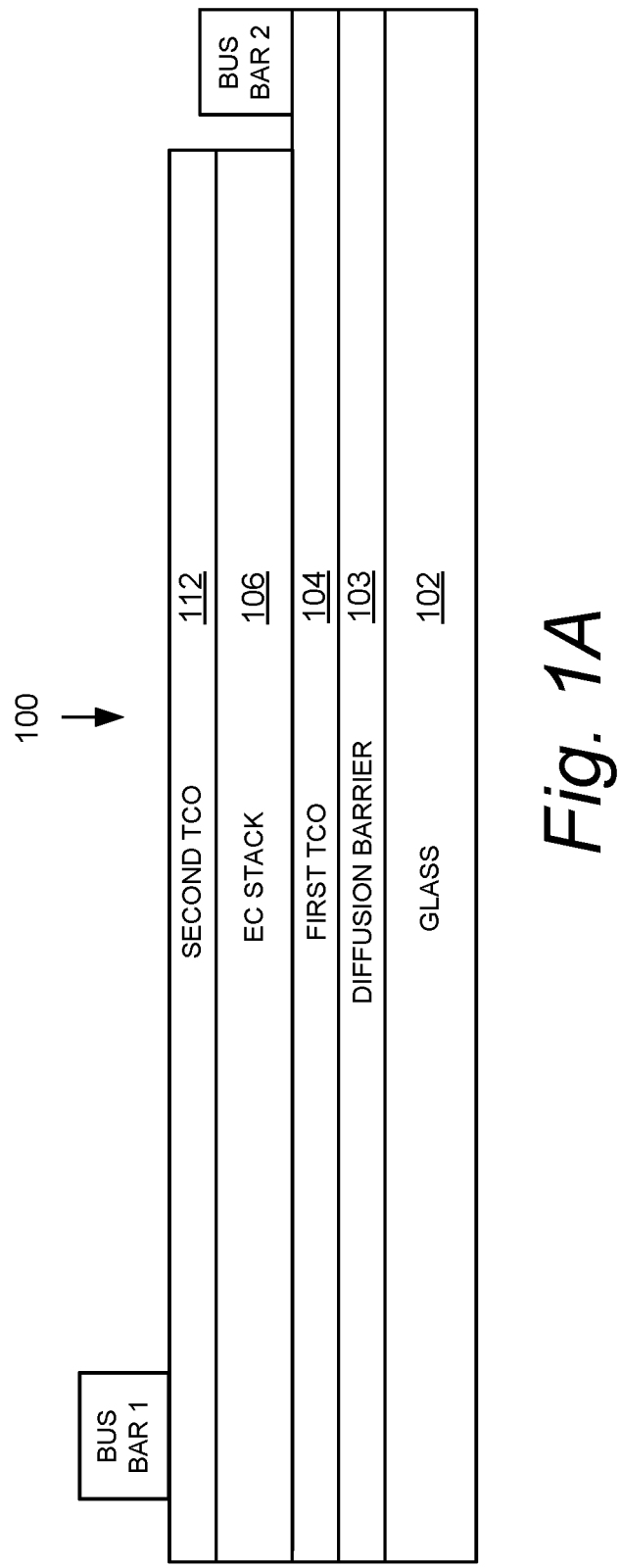

MITIGATING DEFECTS IN AN ELECTROCHROMIC DEVICE UNDER A BUS BAR

CROSS-REFERENCE TO RELATED APPLICATION

This application is a national stage application under 35 U.S.C. § 371 to International PCT Application PCT/US15/65910 titled "MITIGATING DEFECTS IN AN ELECTROCHROMIC DEVICE UNDER A BUS BAR," filed on Dec. 15, 2015, which claims priority to and benefit of U.S. Provisional Patent Application No. 62/094,862, filed Dec. 19, 2014, and titled "MITIGATING DEFECTS IN AN ELECTROCHROMIC DEVICE UNDER A BUS BAR," which are incorporated by reference herein in their entireties and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodically tinting electrochromic material, which transitions from clear (non-colored) to tinted (typically blue) by electrochemical reduction. It transitions from tinted to clear by electrochemical oxidation.

Electrochromic materials may be incorporated into, for example, windows and mirrors for residential, commercial, vehicular, and other uses. The color, transmittance, absorbance, and/or reflectance of such windows may be reversibly changed by applying a charge or potential to the electrochromic material. A small voltage applied to an electrochromic device of the window will cause it to darken; reversing the voltage causes it to lighten. This capability allows control of the amount of light that passes through the windows, and presents an opportunity for electrochromic devices or lites to be used as energy-saving devices.

While electrochromism was discovered in the 1960's, electrochromic devices, and particularly electrochromic devices or lites, still unfortunately suffer various problems, and industries have only recently begun to realize their full commercial potential.

SUMMARY

Methods are provided for fabricating electrochromic devices. One aspect involves a method of fabricating an electrochromic device including fabricating an electrochromic stack on a substrate without first determining one or more regions for bus bar application on the electrochromic device.

Another aspect involves a method of fabricating an electrochromic device including an electrochromic stack between a first and a second transparent, electronically conductive layer configured to deliver potential over surfaces of the electrochromic stack and thereby cause optical switching of the electrochromic device, the method of fabricating including: (a) receiving a substrate; (b) fabricating the electrochromic stack on the first transparent, electronically conductive layer disposed on a surface of the substrate, whereby the electrochromic stack comprises an electrochromic layer and a counter electrode layer; (c) forming the second transparent, electronically conductive layer on the electrochromic stack; (d) forming a bus bar on a region of the second transparent, electronically conductive layer, whereby the region is over the first transparent, electronically conductive layer; and (e) after fabricating the electrochromic stack and the second transparent, electronically conductive layer, (i) deactivating the electrochromic device in the region under the bus bar without substantially deactivating the electrochromic device in regions not under the bus bar, or (ii) activating the electrochromic device in the regions not under the bus bar without substantially activating the electrochromic device in the region under the bus bar. In some embodiments, (e) is performed prior to performing (d), while in other embodiments (e) may be performed after performing (d), while in still other embodiments, deactivating the device in the aforementioned region may be done stepwise, both before application of the bus bar and after. In some embodiments, one or more of the bus bars is provided on a viewable area of the surface of the electrochromic device. One or more of the bus bars may be transparent.

In various embodiments, the method also includes depositing the first transparent, electronically conductive layer on the substrate in an apparatus where the electrochromic stack is fabricated.

In some embodiments, the method also includes continuously feeding the substrate from a roll of the substrate to an apparatus that coats the electrochromic stack on the substrate. In some implementations, the substrate includes a flexible glass. In certain embodiments, whether roll to roll processed, thin glass or not, the substrate is coated with the electrochromic device in one facility, then shipped to another facility for further processing, including cutting the substrate into daughter devices or lites.

The method may also include forming the first transparent, electronically conductive layer on the surface of the substrate. Forming the first transparent, electronically conductive layer, fabricating the electrochromic stack, and forming the second transparent, electronically conductive layer may be performed sequentially in a sputter coating apparatus, which coats the surface of the substrate with the first and the second transparent, electronically conductive layers and the electrochromic stack.

In some embodiments, operations (b) and (c) are performed sequentially in a sputter coating apparatus, which coats the surface of the substrate with the first and the second transparent, electronically conductive layers and the electrochromic stack, and operation (d) is performed outside the sputter coating apparatus. In certain embodiments, (e) is also performed outside the sputter coating apparatus.

The method may be performed without scribing or without isolating a region of the first transparent, electronically conductive layer before depositing the second transparent, electronically conductive layer. The method may be performed without scribing or without isolating a region of the electrochromic stack before depositing the second transparent, electronically conductive layer. In some embodiments, the method may also include forming one or more additional bus bars on the second transparent, electronically conductive layer and/or the first transparent, electronically conductive layer. In some embodiments, the method may also include cutting the substrate to provide multiple electrochromic devices or lites.

The method may be performed without pre-defining where the bus bar for the second transparent, electronically conductive layer will be formed prior to completing the electrochromic device and second transparent, electronically conductive layer.

Fabricating the electrochromic stack may include depositing elemental lithium on the counter electrode layer and/or the electrochromic layer.

The bus bar may have a length of up to about 144 inches. The second transparent, electronically conductive layer may be substantially transparent. In some embodiments, the largest dimension of the substrate is at least about 144 inches. If a roll to roll process is used, the 144 inch dimension refers to the width, while the length of the substrate may be much longer, e.g. several hundred feet long or more.

Deactivating in (e) may include reducing the conductivity of the first transparent, electronically conductive layer in the region under the bus bar and/or the electrochromic layer and/or counter electrode layer of the electrochromic device. Reducing the conductivity may include chemically reacting the first transparent, electronically conductive layer in the region under the bus bar.

Chemically reacting may include exposing the first transparent, electronically conductive layer to a source of reactive oxygen, and whereby the first transparent, electronically conductive layer comprises a transparent layer. The transparent layer may be selected from the group consisting of metal-doped oxides, non-metal doped oxides, nitrides, and metals. In some embodiments, the source of reactive oxygen is the substrate.

Chemically reacting may include forming a passivation layer by contacting the first transparent, electronically conductive layer to a component present in a material applied to form the bus bar or by exposing the first transparent, electronically conductive layer to an elevated temperature.

Deactivating may include preventing lithiation of the electrochromic device in the region under the bus bar.

In some embodiments, the electrochromic layer includes electrochromic metal oxide, and whereby the deactivating in (e) includes reacting interstitial oxygen in the electrochromic layer with the electrochromic metal oxide to produce a stoichiometric or oxygen rich form of the metal oxide which is not electrochromically active. The electrochromic metal oxide may be tungsten oxide.

Deactivating in (e) may include applying excess oxygen in the region under the bus bar.

In some embodiments, operation (e) may include: (i) during operation (b), and/or (c), sensitizing the electrochromic stack, the first transparent, electronically conductive layer, and/or the second transparent, electronically conductive layer; and (ii) after operation (c), locally applying a stimulus under or proximate the bus bar to either deactivate the sensitized electrochromic stack, the first transparent, electronically conductive layer, and/or the second transparent, electronically conductive layer in the region under the bus bar or activate the sensitized electrochromic stack, the first transparent, electronically conductive layer, and/or the second transparent, electronically conductive layer in the regions not under the bus bar.

Sensitizing may include a treatment selected from the group consisting of applying heat, irradiating, applying a chemical or composition, and combinations thereof. The stimulus may be selected from the group consisting of irradiation, heating, exposure to chemical or composition, and combinations thereof.

Reducing the electrical conductivity of the first transparent conducting oxide layer and/or the electrochromic and/or counter electrode layer may include application of heat and/or other energy to one or more of these layers. In some embodiments, IR heating may be used to reduce the electrical conductivity of one or more of these layers. The layers may be fused by heat or their morphology otherwise changed to inhibit electrical conductivity and/or ion movement.

Another aspect involves a method of fabricating an electrochromic device including an electrochromic stack between a first and a second transparent, electronically conductive layer configured to deliver potential over surfaces of the electrochromic stack and thereby cause optical switching of the electrochromic device, the method of fabricating including: (a) receiving a substrate; (b) fabricating the electrochromic stack on the first transparent, electronically conductive layer disposed on a surface of the substrate, whereby the electrochromic stack comprises an electrochromic layer and a counter electrode layer; (c) forming the second transparent, electronically conductive layer on the electrochromic stack; (d) forming a bus bar on a region of the second transparent, electronically conductive layer, whereby the region is over the first transparent, electronically conductive layer; and (e) performing a short mitigation operation that (i) prevents electrical shorts from forming between the second transparent, electronically conductive layer and the first transparent, electronically conductive layer in the region underneath the bus bar and/or (ii) removes electrical shorts that have formed between the second transparent, electronically conductive layer and the first transparent, electronically conductive layer in the region underneath the bus bar, whereby (e) is performed without substantially deactivating the electrochromic device in the region under the bus bar after fabricating the electrochromic stack and the second transparent electronically conductive layer. In some embodiments, one or more of the bus bars is provided on an interior or viewable region of the surface of the electrochromic device. The bus bar may be transparent. One or more bus bars may also be formed. In some embodiments, the one or more of the bus bars may be transparent.

In some embodiments, the short mitigation operation includes forming the bus bar by applying a bus bar conductive material in a medium that does not substantially allow migration of conductive species of the conductive material, thereby inhibiting or preventing the conductive material from reaching and making electrical contact with the second transparent, electronically conductive layer. The medium may be a solid, or the medium may be a tape, or the medium may be a gel or liquid, or the medium may be a polymeric solid that inhibits migration of the conductive material, such as an epoxy, a polyimide, a urethane, and the like. The medium may itself have electrical conductivity, e.g. a polymer functionalized with conductive species e.g. as side chains or integral to the polymeric chain. In certain embodiments, the conductive material itself is configured so as not to migrate. In certain embodiments, an electrically conductive barrier layer is applied to the second transparent conductive layer and then a bus bar is applied thereupon. The electrically conductive barrier layer may be made of a material that is less electrically conductive than the bus bar, or the same or greater conductivity.

The short mitigation operation may include forming the bus bar by applying a bus bar conductive material in a medium that sequesters the conductive material thereby preventing the conductive material from migrating to the second transparent, electronically conductive layer.

The short mitigation operation may include forming a barrier layer between the bus bar and the second transparent, electronically conductive layer. The barrier layer may include a material such as graphite and graphene, titanium oxide, tin oxide, zinc oxide, aluminum oxide, aluminum nitride, titanium nitride, tantalum nitride, chromium, a nitride, a $SiO_xN_y$ compound, carbon, and combinations thereof.

The short mitigation operation may be performed during (d) such that forming the bus bar includes forming the bus bar from a composition including a conductive material that resists electromigration into the second transparent, electronically conductive layer.

The short mitigation operation may include applying a stimulus that heals the existing shorts between the second transparent, electronically conductive layer and the layer of the electrochromic device. Applying the stimulus that heals the existing shorts may include applying current between the second transparent, electronically conductive layer and the layer of the electrochromic device in the region underneath the bus bar. Applying the stimulus that heals the existing shorts may include exposing the electrochromic device in the region underneath the bus bar to elevated temperature. Applying the stimulus that heals the existing shorts may include exposing the electrochromic device in the region underneath the bus bar to laser energy. Applying the stimulus that heals existing shorts may include reacting the existing shorts with a chemical to render the existing shorts relatively non-conductive. The stimulus may be, e.g. alternating current, heat, laser irradiation, and the like.

The short mitigation operation may include blocking passages in the second transparent, electronically conductive layer at points where the shorts may otherwise form. The passages may include defects, depressions, or fissures in the second transparent, electronically conductive layer. Blocking passages in the second transparent, electronically conductive layer may include melting or flowing at least a portion of the second transparent, electronically conductive layer. Blocking passages in the second transparent, electronically conductive layer may include filling the passages with a material that blocks migration of material from the bus bar into the second transparent, electronically conductive layer. Blocking passages in the second transparent, electronically conductive layer may include capping the second transparent, electronically conductive layer with a substantially non-conducting material prior to forming the bus bar in (d). The material may be, e.g. an electrically non-conductive polymeric material.

In various embodiments, the method also includes depositing the first transparent, electronically conductive layer on the substrate in an apparatus where the electrochromic stack is fabricated. Some methods may involve performing (e) prior to performing (d).

In some embodiments, the method also includes continuously feeding the substrate from a roll of the substrate to an apparatus that coats the electrochromic stack on the substrate. In some implementations, the substrate includes a flexible glass.

The method may also include forming the first transparent, electronically conductive layer on the surface of the substrate. Forming the first transparent, electronically conductive layer, fabricating the electrochromic stack, and forming the second transparent, electronically conductive layer may be performed sequentially in a sputter coating apparatus, which coats the surface of the substrate with the first and second transparent, electronically conductive layers and the electrochromic stack.

In some embodiments, operations (b) and (c) are performed sequentially in a sputter coating apparatus, which coats the surface of the substrate with the first and second transparent, electronically conductive layers and the electrochromic stack, and operation (d) is performed outside the sputter coating apparatus.

The method may be performed without scribing or without isolating a region of the first transparent, electronically conductive layer before forming the second transparent, electronically conductive layer. The method may be performed without scribing or without isolating a region of the electrochromic stack before forming the second transparent, electronically conductive layer. In some embodiments, the method may also include forming one or more additional bus bars on the second transparent, electronically conductive layer and/or the first transparent, electronically conductive layer. The one or more bus bars may be transparent. In some embodiments, the method may also include cutting the substrate to provide multiple electrochromic devices or lites.

The method may be performed without pre-defining where the bus bar for the second transparent, electronically conductive layer will be formed prior to completing the electrochromic device and second transparent, electronically conductive layer.

Fabricating the electrochromic stack may include depositing elemental lithium on the counter electrode layer and/or the electrochromic layer.

Another aspect involves an electrochromic device including: a substrate having a surface; a first transparent, electronically conductive layer disposed on the substrate surface; an electrochromic stack on the first transparent, electronically conductive layer, whereby the electrochromic stack includes an electrochromic layer and a counter electrode layer; a second transparent, electronically conductive layer on the electrochromic stack; and a bus bar electrically coupled to a region of the second transparent, electronically conductive layer, whereby the region is over the first transparent, electronically conductive layer, and whereby the electrochromic stack is disposed between the two transparent, electronically conductive layers, which are configured to deliver potential over surfaces of the electrochromic stack and thereby cause optical switching of the electrochromic device, whereby the electrochromic stack is deactivated in the region under the bus bar after the electrochromic stack and second transparent electronically conductive layer are fabricated.

Another aspect involves an electrochromic device including: a substrate having a surface; a first transparent, electronically conductive layer disposed on the substrate surface; an electrochromic stack on the first transparent, electronically conductive layer, whereby the electrochromic stack includes an electrochromic layer and a counter electrode layer; a second transparent, electronically conductive layer on the electrochromic stack; and a bus bar electrically coupled to a region of the second transparent, electronically conductive layer, whereby the region is over the first transparent, electronically conductive layer, and whereby the electrochromic stack is disposed between the two transparent, electronically conductive layers, which are configured to deliver potential over surfaces of the electrochromic stack and thereby cause optical switching of the electrochromic device, whereby the electrochromic stack is active and shorts and/or latent defects are mitigated in the region under the bus bar. In some embodiments, at least one of the latent defects is a latent short.

Another aspect involves a system for fabricating an electrochromic device including an electrochromic stack between two transparent, electronically conductive layers configured to deliver potential over surfaces of the electrochromic stack and thereby cause optical switching of the electrochromic device, the apparatus of fabricating including: (a) a coating apparatus configured to receive a substrate, optionally having a surface with a first transparent, electronically conductive layer disposed thereon, fabricate the electrochromic stack on the first transparent, electronically conductive layer, wherein the electrochromic stack includes an electrochromic layer and a counter electrode layer, and form a second transparent, electronically conductive layer on the electrochromic stack; and (b) a post coating patterning apparatus configured to receive the substrate with the electrochromic stack between the two transparent, electronically conductive layers, form one or more bus bars electrically coupled to the second transparent, electronically conductive layer and/or the first transparent, electronically conductive layer, and deactivate the underlying device in the region underneath the one or more bus bars. The post coating patterning apparatus may be further configured to cut the substrate to provide multiple electrochromic devices or lites. The post coating apparatus may be configured to form one or more bus bars electrically coupled to the first transparent, electronically conductive layer.

Another aspect involves a system for fabricating an electrochromic device including an electrochromic stack between two transparent, electronically conductive layers configured to deliver potential over surfaces of the electrochromic stack and thereby cause optical switching of the electrochromic device, the apparatus of fabricating including: (a) a coating apparatus configured to receive a substrate, optionally having a surface with a first transparent, electronically conductive layer disposed thereon, fabricate the electrochromic stack on the first transparent, electronically conductive layer, wherein the electrochromic stack comprises an electrochromic layer and a counter electrode layer, and form a second transparent, electronically conductive layer on the electrochromic stack; and (b) a post coating patterning apparatus configured to receive the substrate with the electrochromic stack between the two transparent, electronically conductive layers, form one or more bus bars electrically coupled to the second transparent, electronically conductive layer and/or the first transparent, electronically conductive layer, and block penetration of the bus bar material. The post coating patterning apparatus may be further configured to cut the substrate to provide multiple electrochromic devices or lites. The post coating apparatus may be configured to form one or more bus bars electrically coupled to the first transparent, electronically conductive layer.

Another aspect involves a method of manufacturing an electrochromic device including an electrochromic stack between a first and a second transparent electronically conductive layer configured to deliver potential over surfaces of the electrochromic stack and thereby cause optical switching of the electrochromic device, the method of manufacturing including: (a) fabricating the electrochromic device on a glass substrate without pre-patterning in a first facility; (b) shipping the glass substrate including the electrochromic stack to a second facility; and (c) performing post-processing in the second facility. In various embodiments, (c) includes applying one or more bus bars to the electrochromic stack. In some embodiments, the method also includes deactivating the electrochromic stack under at least one of the one or more bus bars applied on the substrate during post-processing. The deactivation may be performed either before or after applying the one or more bus bars. Certain methods include applying a hermetic sealing layer to the electrochromic device prior to (b). The hermetic sealing layer is applied to the exposed (top) transparent conductive oxide layer and may be permanent or temporary, e.g. in the latter case a peelable coating or layer that can be etched away or otherwise removed. In some embodiments, (c) may include cutting the glass substrate including the electrochromic stack to multiple electrochromic lites. In some embodiments, (c) may include laser patterning of the electrochromic device.

In some embodiments, the deactivating includes sensitizing the electrochromic stack, the first transparent, electronically conductive layer and/or the second transparent, electronically conductive layer by performing a treatment selected from the group consisting of applying heat, irradiating, applying a chemical or composition, and combinations thereof.

In various embodiments, (c) includes performing a short mitigation operation that (i) prevents electrical shorts from forming between the second transparent electronically conductive layer and the first transparent electronically conductive layer in a region underneath the bus bar and/or (ii) removes electrical shorts that have formed between the second transparent electronically conductive layer and the first transparent electronically conductive layer in the region underneath the bus bar, and wherein the short mitigation operation is performed without substantially deactivating the electrochromic device in the region under the bus bar after fabricating the electrochromic stack and second transparent electronically conductive layer.

In some embodiments, the method also includes providing hermetic protection on the electrochromic stack prior to (b).

In some embodiments, providing the hermetic protection includes forming a hermetic top coat over the electrochromic stack. In some embodiments, the hermetic top coat is made of material such as parylenes, silicon-based encapsulants, epoxy-based encapsulants, oxide-polymer multilayers, and combinations thereof.

In some embodiments, the method also includes removing the hermetic top coat at the second facility.

In some embodiments, the glass substrate including the electrochromic stack has a roughness of less than about 30 nm.

In some embodiments, the method also includes providing the glass substrate including the electrochromic stack in an environment protected from atmospheric moisture. In some embodiments, the environment is an argon environment.

In some embodiments, the method also includes providing the glass substrate including the electrochromic stack with at least one other glass substrate with an electrochromic stack interleaved with a protective material.

In various embodiments, the protective material includes a powder and/or an interleaving sheet. In some embodiments, the interleaving sheet is rice paper.

In some embodiments, the shipped glass substrate including the electrochromic stack is not tempered. In some embodiments, the method also includes annealing the glass substrate including the electrochromic stack after cutting during the post-processing at the second facility. In some embodiments, the shipped glass substrate including the electrochromic stack includes an electrochromic precursor. In some embodiments, the method also includes tempering the glass substrate including the electrochromic stack after cutting during the post-processing at the second facility.

Another aspect involves a method of fabricating an electrochromic device, the method including a. depositing a first electrochromic stack including a first electrochromic layer and a first counter electrode layer on a first transparent, electronically conductive layer; b. depositing a second electrochromic stack including a second electrochromic layer and a second counter electrode layer on the first electrochromic stack, wherein at least one of the electrochromic stacks includes super-stoichiometric oxygen at the interface between the electrochromic and counter electrode layers; c. depositing lithium on the second electrochromic stack; d. depositing a second transparent, electronically conductive layer on the second electrochromic stack, to form an electrochromic device precursor; and e. selectively activating the electrochromic device precursor in regions other than a region where a bus bar configured to power the second transparent, electronically conductive layer will reside.

In some embodiments, the bus bar is a non-penetrating bus bar.

The region where the bus bar will reside may be configured to extend about 0.5 mm to about 5 mm past any edge of the bus bar, when the bus bar is fabricated within the area. The region where the bus bar will reside may be configured to extend about 0.5 mm to about 2 mm past any edge of the bus bar, when the bus bar is fabricated within the area. The region where the bus bar will reside may be configured to extend about 0.5 mm to about 1 mm past any edge of the bus bar, when the bus bar is fabricated within the area.

The method may also include deactivating the region to inhibit electrical conduction between the first and second transparent, electronically conductive layers.

In some embodiments, the bus bar includes a bus bar conductive material in a medium that sequesters conductive material thereby preventing the conductive material from migrating to the second transparent, electronically conductive layer.

These and other aspects are described further below with reference to the drawings.

BRIEF DESCRIPTION OF THE DRAWINGS

FIGS. 1A-1C are schematic representations of an example of an electrochromic device.

DETAILED DESCRIPTION

The following description includes certain details to provide context and/or full illustration of recited embodiments, which, however, may be practiced without some or all of these details. Thus, while some disclosed embodiments are described with the specific operations and/or features, the patent applicant does not intend to limit the embodiments to these operations and/or features. In some instances, well-known operations and/or features are not described to clarify the disclosed embodiments.

INTRODUCTION

For the purposes of brevity, embodiments are described in terms of electrochromic (EC) devices; however, the scope of the disclosure is not so limited. One of ordinary skill in the art would appreciate that the methods and devices described apply to other thin-film devices where one or more layers are sandwiched between two thin-film conductor layers. Certain embodiments are directed to optical devices, that is, thin-film devices having at least one transparent conductor layer. In the simplest form, an optical device includes a substrate and one or more material layers sandwiched between two conductor layers, one of which is transparent. In one embodiment, an optical device includes a transparent substrate and two transparent conductor layers. In another embodiment, an optical device includes a transparent substrate, a lower transparent conductor layer disposed thereon, and an upper conductor layer that is not transparent. In another embodiment, the substrate is not transparent, and one or both of the conductor layers is transparent. Some examples of optical devices include electrochromic devices, electroluminescent devices, photovoltaic devices, suspended particle devices (SPD's), and the like. For context, a description of electrochromic devices is presented below. For convenience, all solid-state and inorganic electrochromic devices are described; however, embodiments are not limited in this way.

Figure 1B:
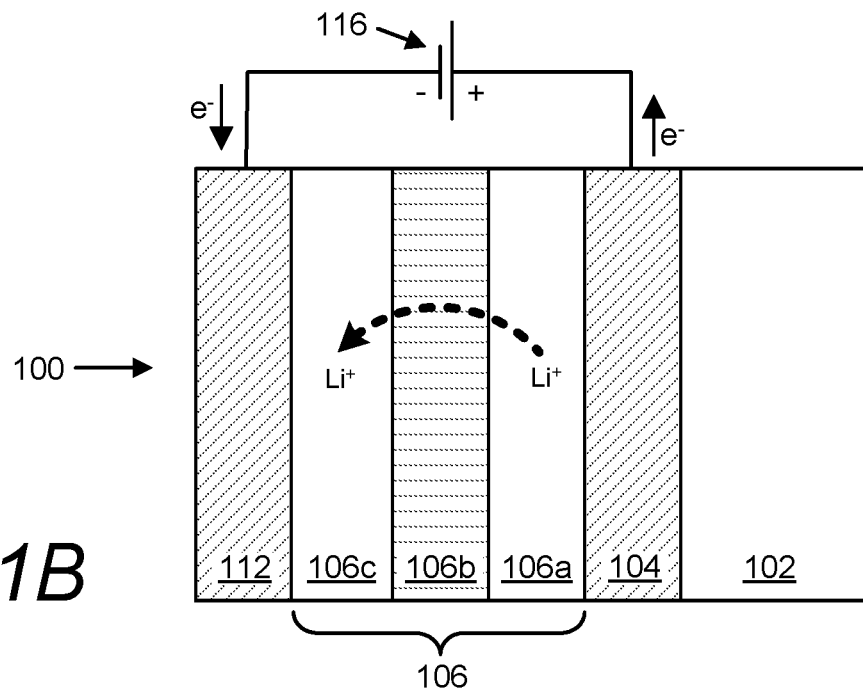
Figure 1C:
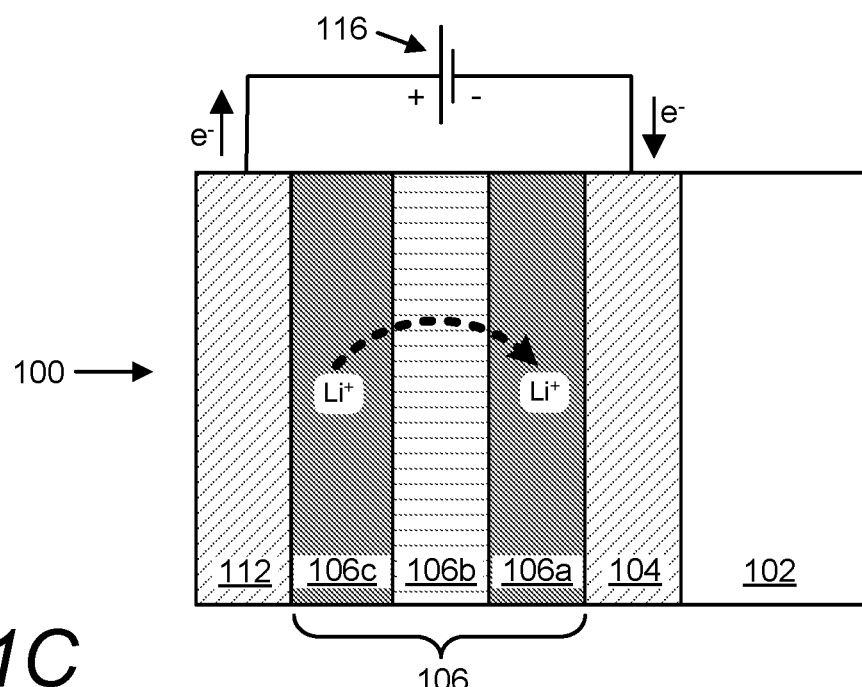

Examples of electrochromic device structure and fabrication will be presented. FIGS. 1A-1C are schematic cross-sections of an electrochromic device 100, showing a structural motif for such a device. Electrochromic device 100 includes a glass substrate 102, a diffusion barrier 103, a conductive layer (CL) layer 104, an EC stack 106, and another conductive layer (CL) 112. The substrate may be made of a glass material and especially an architectural glass or other shatter-resistant glass material such as, for example, a silicon oxide ($SO_x$)-based glass material. As a more specific example, a substrate can be a soda-lime glass substrate or float glass substrate. Such glass substrates can be composed of, for example, approximately 75% silica ($SiO_2$) as well as $Na_2O$, CaO, and several minor additives. However, the substrate can be formed of any material having suitable optical, electrical, thermal, and mechanical properties. For example, other suitable substrates can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first and the second panes (not shown) can be strengthened, for example, by tempering, heating, or chemically strengthening. Glass substrates may be incorporated such that one or more substrates may be used to form an insulated glass unit (IGU).

The EC stack 106 includes an electrochromic layer (not shown) and an ion conducting (electronically resistive) layer (IC) (not shown). The EC stack may also include an opposing counter electrode layer also known as an ion storage layer. This layer may or may not be electrochromic. Generally such devices are constructed so that the electrochromic layer is cathodically coloring and the counter electrode layer is anodically coloring. Though this is not limiting, it has the advantage that the coloring layers are complimentary, i.e. they color or bleach concurrently and thus deeper coloration and more neutral coloration can be achieved.

The conductive layers 104 and 112 commonly include transparent conductive materials, such as metal layers, metal oxides, alloy oxides, and doped versions thereof, and are commonly referred to as "TCO" layers because they are sometimes made from transparent conducting oxides or transparent metal oxides. The term "TCO" is conventionally used to refer to a wide range of transparent conductive materials that can be formed as conductive layers used to deliver potential across the face of an electrochromic device to drive or hold an optical transition. While such materials are referred to as TCOs in this document, the term encompasses non-oxides as well as oxides that are transparent and electronically conductive such as certain very thin metals and certain non-metallic materials. Transparent conductive material typically has an electronic conductivity significantly greater than that of the electrochromic material or the counter electrode material. For example, the transparent conductive material may have a resistivity of at least about 100 μOhm-cm to about 600 μOhm-cm. Further, the transparent conductive material may have a sheet resistance of at most about 10 Ohms/square to about 20 Ohms/square. Example transparent layers include indium tin oxide (ITO), fluorinated tin oxide (FTO), and aluminum zinc oxide (AZO). The term "TCO" as described herein may also include multi-layer structures. For example, a TCO may include a first ITO layer, a metal layer, and a second ITO layer, with the metal layer between the two ITO layers. A TCO may also refer to a multi-layer structure having one or more layers of transparent conductive materials. Some TCOs may also include a metallic top or bottom conducting layer.

As described herein, the conductive layer 104 may be referred to as the "first TCO," "bottom TCO" or "TCO1." The conductive layer 112 may be referred to as the "second TCO," or "top TCO" or "TCO2." In general, however, the transparent layers can be made of any transparent, electronically conductive material that is compatible with the device stack. Some glass substrates are provided with a thin transparent conductive oxide layer such as fluorinated tin oxide, sometimes referred to as "FTO." In some embodiments, the second TCO is substantially transparent. A substantially transparent component of device is a device whereby at least about 80% or at least about 90% of light is transmitted through the device.

The bottom TCO 104 is the first of two conductive layers used to form the electrodes of the electrochromic device 100 fabricated on the glass substrate or glass sheet 102. In some examples, the glass substrate 102 may be prefabricated with the diffusion barrier 103 formed over underlying glass 102. Thus, in some embodiments, the diffusion barrier 103 is deposited prior to depositing the bottom TCO 104, EC stack 106 (e.g., stack having electrochromic, ion conductor, and counter electrode layers), and top TCO 112. In some embodiments, the glass substrate 102 may be prefabricated with both the diffusion barrier 103 and the bottom TCO 104 formed over underlying glass 102.

A non-penetrating bus bar (bus bar 1 or "top bus bar" as used herein) is applied to the top TCO 112. A non-penetrating bus bar (bus bar 2 or "bottom bus bar" as used herein) is applied on the bottom TCO 104 to an area where an EC stack 106 and a top TCO 112 was not deposited or was removed (for example, from a mask protecting the bottom TCO 104 from device deposition or by using a mechanical abrasion process or by using a laser ablation process). A bus bar is generally an electrical connection for providing current and voltage to conductive layer(s), often to drive or maintain an optical state. Bus bars may be penetrating or non-penetrating. A penetrating bus bar is one that is typically pressed into (or soldered) and through one or more layers to make contact with a lower conductor, e.g. TCO located at the bottom of or below one or more layers of the EC stack). Conventionally, bus bars 1 and 2 may be fabricated from ink applied as a liquid. In some embodiments, bus bar 1 is aligned such that it is deposited on the edge of the top TCO 112. In various embodiments, bus bars are applied as part of a post-patterning process. Bus bar materials may include liquid silver ink. In some embodiments, bus bar 2 may be a penetrating bus bar. In some embodiments, bus bar 2 may be applied on top of the entire EC stack, which penetrates down to touch the first TCO layer. For example, an ultrasonically soldered bus bar may be used in this manner. In such a configuration, an isolation line may be applied at least through top TCO 112, but not penetrating through bottom TCO 104.

The TCO layers 104 and 112 can be electrically connected using the bus bars, which may be fabricated using screen and lithography patterning methods. Electrical communication is established between the device's TCO layers via silk screening (or using another patterning method) a conductive ink followed by heat curing or sintering the ink.

FIG. 1B is a schematic representation of the operation of an electrochromic device 100, which includes the substrate 102, a bottom TCO 104, an EC electrode layer 106a, an optional ion conducting (electronically resistive) layer (IC) 106b, a counter electrode layer (CE) 106c, and top TCO 112. Elements 106a, 106b, and 106c are collectively referred to as an electrochromic stack 106. A voltage source operable to apply an electric potential across electrochromic stack 106 effects the transition of the electrochromic device from, e.g., a clear state to a tinted state. In various embodiments, the EC stack is fabricated by forming the counter electrode layer in direct contact with the EC electrode layer. The resulting construct has either no IC layer or an IC layer that forms in situ after or during deposition of the EC electrode and/or counter electrode layer. Such devices are described in U.S. patent Ser. No. 12/772,055 (now U.S. Pat. No. 8,300,298), filed Apr. 30, 2010, and Ser. No. 12/814,279 (now U.S. Pat. No. 8,764,952), filed Jun. 11, 2010, both incorporated herein by reference in their entireties.

As shown in FIG. 1B, a voltage source 116 operable to apply an electric potential across the EC stack 106 effects the transition of the electrochromic device 100 from, e.g., a clear state (refer to FIG. 1B) to a tinted state (refer to FIG. 1C).

During normal operation, an electrochromic device such as device 100 reversibly cycles between a clear state and a tinted state. During tinting of the electrochromic device 100, bus bar 1 (or "top bus bar" as used herein) and bus bar 2 (or "bottom bus bar" as used herein) as shown in FIG. 1A are energized in order to apply a potential as shown in FIG. 1B across the electrochromic device; for example, bottom TCO 104 has a negative charge and top TCO 112 has a positive charge or vice versa. As depicted in FIG. 1B, in the clear state, a potential is applied across the electrodes (TCO layers 104 and 112) of EC stack 106 to cause available ions (e.g. lithium ions) in the stack to reside primarily in the counter electrode 106c. If electrochromic layer 106a includes a cathodically tinting material, the device is in a clear state. In certain electrochromic devices, when loaded with the available ions, counter electrode layer 106c can be thought of as an ion storage layer.

Device 100 as shown in FIGS. 1A-1C is meant for illustrative purposes, in order to understand the context of embodiments described herein. Methods and apparatus described herein are used to identify and reduce defects in electrochromic devices, regardless of the structural arrangement of the electrochromic device.

The order of layers may be reversed with respect to the substrate 102. That is, the layers may be in the following order: substrate, conductive layer, counter electrode layer, ion conducting layer, EC layer, and conductive layer. The counter electrode layer may include a material that is electrochromic or not. If both the electrochromic layer and the counter electrode layer employ electrochromic materials, one of them should be a cathodically tinting material and the other should be an anodically tinting material. For example, the EC layer may employ a cathodically tinting material and the counter electrode layer may employ an anodically tinting material. This is the case when the electrochromic layer is a tungsten oxide and the counter electrode layer is a nickel tungsten oxide.

Referring to FIG. 1C, when the potential on the EC stack 106 is reversed, the ions are transported across ion conducting layer 106b to electrochromic layer 106a and cause the material to enter the tinted state. Again, this assumes that the optically reversible material in the electrochromic device is a cathodically tinting electrochromic material. In certain embodiments, the depletion of ions from the counter electrode material causes it to tint also as depicted. In other words, the counter electrode material is anodically tinting electrochromic material. Thus, layers 106a and 106c combine to synergistically reduce the amount of light transmitted through the stack. When a reverse voltage is applied to device 100, ions travel from EC layer 106a, through the ion conducting layer 106b, and back into counter electrode layer 106c. As a result, the device is clear.

Some examples of suitable electrochromic devices are presented in the following US patent applications, each incorporated by reference in its entirety: U.S. patent application Ser. No. 12/645,111, filed Dec. 22, 2009; U.S. patent application Ser. No. 12/772,055 (now U.S. Pat. No. 8,300,298), filed Apr. 30, 2010; U.S. patent application Ser. No. 12/645,159 (now U.S. Pat. No. 8,432,603), filed Dec. 22, 2009; U.S. patent application Ser. No. 12/814,279 (now U.S. Pat. No. 8,764,951), filed Jun. 11, 2010; U.S. patent application Ser. No. 13/462,725, filed May 2, 2012; U.S. Provisional Patent Application No. 61/988,107, filed May 2, 2014; U.S. patent application Ser. No. 13/763,505 (now U.S. Pat. No. 9,007,674), filed Feb. 8, 2013.

Electrochromic devices such as those described in relation to FIGS. 1A-1C are used in, for example, electrochromic windows. An electrochromic window is a window that includes an electrochromic lite which is a transparent panel that changes in an optical property such as color or degree of tinting when a driving potential is applied to the lite. For example, an electrochromic lite may tint to filter out 50% of light or filter out about 70% of light transmitted through the panel. Electrochromic windows may be deployed in buildings such as commercial skyscrapers, or residential homes, to help save energy used in central heating or air conditioning systems. For example, an electrochromic lite may be tinted to reduce the amount of light entering a room during a warm day, to reduce the energy used to power an air-conditioner in the room. For example, substrate 102 may be architectural glass upon which electrochromic devices are fabricated. Architectural glass is glass that is used as a building material. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, e.g., as large as about 72 inches by 120 inches, or as large as about 72 inches by 144 inches.

In some embodiments, electrochromic glass is integrated into an insulated glass unit (IGU). An IGU includes multiple glass panes assembled into a unit, generally with the intention of maximizing the thermal insulating properties of a gas contained in the space formed by the unit while at the same time providing clear vision through the unit. Insulated glass units incorporating electrochromic glass are similar to IGUs currently known in the art, except for electrical terminals for connecting the electrochromic glass to voltage source.

Generally, the substrate and the IGU as a whole, is a rectangular solid. However, in some other implementations other shapes (for example, circular, elliptical, triangular, curvilinear, convex, concave) are possible and may be desired. In some implementations, a length "L" of the substrate can be in the range of approximately 20 inches to approximately 12 feet, a width "W" of each substrate can be in the range of approximately 20 inches to approximately 12 feet, and a thickness "T" of each substrate can be in the range of approximately 1 millimeter to approximately 10 millimeters (although other lengths, widths or thicknesses, both smaller and larger, are possible and may be desirable based on the needs of a particular user, manager, administrator, builder, architect or owner). Additionally, the IGU may include two panes (not shown), or in some other implementations, an IGU can include three or more panes. Each pane may be a glass substrate as described above. Furthermore, in some implementations, one or more of the panes can itself be a laminate structure of two, three, or more layers or sub-panes.

Figure 1D:
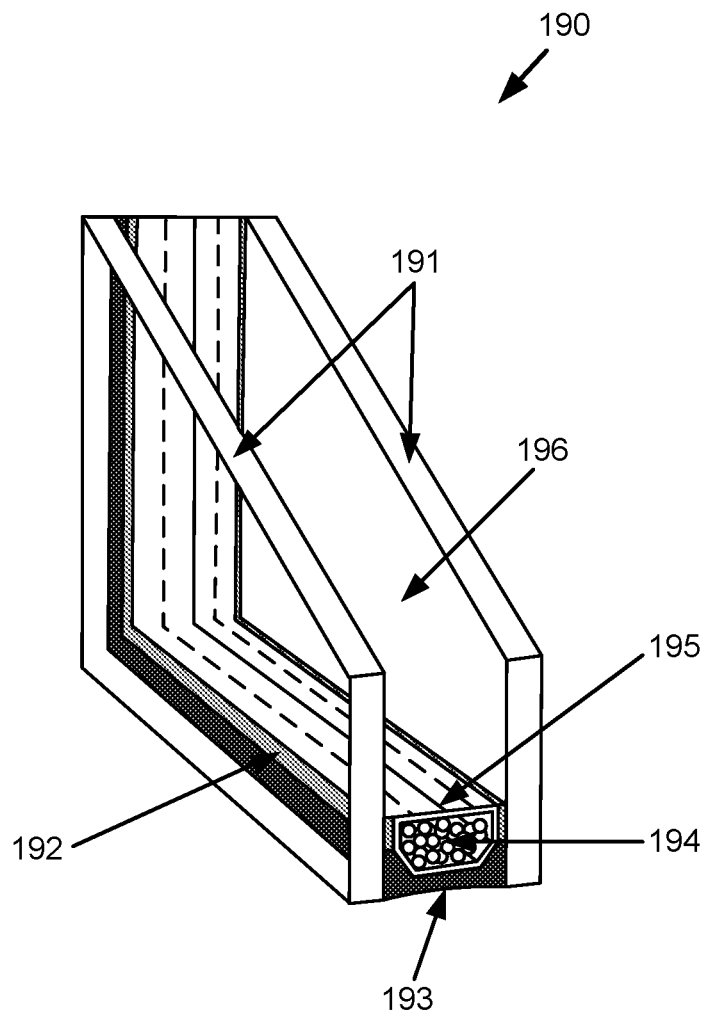
FIG. 1D is a schematic representation of an insulated glass unit.

Panes or substrates of an IGU are spaced apart from one another by spacers to form an interior volume. FIG. 1D shows an example of an IGU 190 with a spacer 195 between two panes of glass 191 and primary and secondary seals, 192 and 193, respectively. Spacer 195 in this example is a hollow metal structure with a desiccant 194 inside. In some implementations, the interior volume or air space 196 is filled with Argon (Ar), although in some other implementations, the interior volume or air space 196 can be filled with another gas, such as another noble gas (for example, krypton (Kr) or xenon (Xe)), another (non-noble) gas, or a mixture of gases (for example, air). Filling the interior volume or air space 196 with a gas such as Ar, Kr, or Xe can reduce conductive heat transfer through the IGU because of the low thermal conductivity of these gases as well as improve acoustic insulation due to their increased atomic weights. In some other implementations, the interior volume or air space 196 can be evacuated of air or other gas. The spacer 195 generally determine the thickness of the interior volume; that is, the spacing between the substrates. In some implementations, the spacing between the substrates is in the range of approximately 0.375" to approximately 1". The width of the spacer 195 can be in the range of approximately 0.25" to approximately 1." Although not shown in the cross-sectional view, the spacer 195 can be formed around all sides of the IGU (for example, top, bottom, left and right sides of the IGU). For example, the spacer 195 can be formed of a foam or plastic material. However, in some other implementations, the spacer 195 can be formed of metal or other conductive material, for example, a metal tube structure. A first primary seal 192 adheres and hermetically seals each of the spacer 195 and the second surface of a first pane or lite. A second primary seal 192 adheres and hermetically seals each of the spacer 195 and the first surface of a second pane or lite. In some implementations, each of the primary seals 192 and can be formed of an adhesive sealant such as, for example, PIB (polyisobutylene). The moisture vapor barrier and the seal create a hermetic air space. The material acts as a soft, sticky o-ring around the perimeter of the spacer 195 to create the seal between the spacer 195 and the glass surface. In some implementations, the IGU further includes secondary seal 193 that hermetically seals a border around the entire IGU outside of the spacers 195. The secondary seal 193 is used for structural integrity. If fills in the gap around the entire perimeter of the IGU, typically about 3 mm to about 9 mm deep from the edge. It has the consistency of tar upon application and then cures and hardens to a rubber-like consistency before shipment. To this end, the spacer 195 can be inset from the edges of the first and the second panes or lites by a distance. In some implementations, the secondary seal 193 can be formed of an adhesive sealant such as, for example, silicone or polysulfide.

An electrochromic device such as the one depicted in FIG. 1A may have certain types of defects, notably small short circuits, which sometimes manifest as "halos". As used herein, the term "defect" refers to a defective point or region of an electrochromic device. Typically, defects are electrical shorts or pinholes. A short is a localized electronically conductive pathway spanning the ion conducting layer (e.g., an electronically conductive pathway between the two transparent conducting layers). Halos are relatively large, perceptible regions of the device where no tinting occurs. The short circuit prevents the area surrounding electrochromic device from tinting, resulting in a small circle of material that cannot undergo tinting and clearing as described above.

Further, defects may be characterized as visible or non-visible. In general, a defect in an electrochromic device, and sometimes an area around the defect, does not change optical state (e.g., tint) in response to an applied potential that is sufficient to cause non-defective regions of the electrochromic device to tint or otherwise change optical state. Often a defect will be manifest as visually discernible anomalies in the electrochromic lite or other device. Such defects are referred to herein as "visible" defects. Other defects are so small that they are not visually noticeable to the observer in normal use (e.g., such defects do not produce a noticeable light point or "pinhole" when the device is in the tinted state during daytime).

A short is a localized electronically conductive pathway spanning the ion conducting layer (e.g., an electronically conductive pathway between the two transparent conducting layers). A short may form between a second transparent, electronically conductive layer and another layer of the EC stack. For example, a short may form between a second transparent, electronically conductive layer and a first transparent, electronically conductive layer. Typically, a defect causing a visible short will have a physical dimension on the order of tens micrometers, sometimes less, which is a relatively small defect from a visual perspective. However, these relatively small defects result in a visual anomaly, the "halo", in the tinted electrochromic lite that are, for example, about 1 centimeter in diameter, sometimes larger.

A pinhole is a region where one or more layers of the electrochromic device are damaged or deactivated so that electrochromism is not exhibited. Pinholes are not electrical shorts, and, as described above, they may be the result of mitigating an electrical short in the device. In certain embodiments, a pinhole has a defect dimension of between about 25 micrometers and about 300 micrometers, typically between about 50 micrometers and about 150 micrometers, thus it is much harder to discern visually than a halo.

Typically, in order to reduce the visible perception of pinholes resulting from mitigation of halos, one will limit the size of a purposely-created pinhole to about 100 micrometers or less.

In some cases, an electrical short is created by a conductive particle lodging in and/or across the ion conducting layer, thereby causing an electronic path between the counter electrode layer and the electrochromic layer or the transparent conducting layer associated with either one of them.

Shorts may be formed inherently through the electrochromic device fabrication process. As noted above, in the case of a visible short the defect will appear as a light central region (when the device is in the tinted state) with a diffuse boundary such that the device gradually darkens with distance from the center of the short. If there are a significant number of electrical shorts (visible or non-visible) concentrated in an area of an electrochromic device, they may collectively impact a broad region of the device whereby the device cannot switch in such region. This is because the potential difference between the EC and CE layers in such regions cannot attain a threshold level required to drive ions across the ion conductive layer.

Visible shorts produce a halo when the device is darkened. A halo is a region in the device where an electrical short across the electrochromic stack causes an area around the short to drain current into the short and therefore the area surrounding the short is not darkened. As mentioned, these regions can be up to about 1 cm in diameter, and thus present a problem by making the electrochromic lite, when colored, unattractive to the observer. This frustrates the purpose of having lites that can operate in a tinted mode. Halos may also form around the edge of a bus bar when multiple micro-shorts occur between the bus bar and bottom TCO. The bus bar may be the source of shorts such that the micro-shorts collectively form one large defect under the bus bar. The defect then subsequently causes the formation of a halo around the edge of the bus bar.

Because the electrochromic device is nonfunctional at the short, the material remains clear thereby forming the halo when the rest of the electrochromic device is tinted. Historically, halos commonly occurred in viewable areas of an electrochromic lite. The viewable area may be defined as area of an electrochromic lite where light may pass through. In some embodiments, a viewable area may be inside the perimeter of an IGU or other "window" arrangement where an opaque spacer or frame element is located. Improvements in device design and fabrication technology pioneered by View, Inc. of Milpitas, Calif. have greatly reduced this problem. However, certain new EC technologies may give rise to halos at or near the locations where the top bus bar resides. Although spacers used in IGUs may normally obscure the area of a lite where the top bus bar is applied, halos may extend beyond the inner edge of the spacer location, and be visible to a user. Without being bound by a particular theory, it is believed that migration of bus bar material into the underlying electrochromic device can cause shorts to form the effect of which radiates an area of non-coloration into the viewable area. One form of this migration is when bus bar material, such as silver-based liquid ink, fills in cracks and depressions within the electrochromic device, thus creating shorts. Such cracks and depressions may be in the size range of about 5 μm to about 100 μm in width and can extend either partially into the electrochromic device or, in some embodiments, down to the first TCO layer. In some embodiments, these depressions are created by foreign debris that contaminates the edge of the glass prior to applying the EC coating and subsequently dislodges over time. Shorts or latent defects may be mitigated by short mitigation operations as described herein. In some embodiments, a latent short is a latent defect that is mitigated by fabrication methods in disclosed embodiments.

Some observations suggest that the top TCO 115 may have small pinholes less than about 100 μm in diameter. The process for depositing a top TCO during fabrication of the electrochromic device may cause the formation of such fissures or defects. Often a defect will be manifest as visually discernible anomalies in the electrochromic lite or other device. Such defects are referred to herein as "visible" defects. Other defects are so small that they are not visually noticeable to the observer in normal use (e.g., such defects do not produce a noticeable light point or "pinhole" when the device is in the colored state during daytime).

A pinhole occurs where one or more layers of the electrochromic device are missing or damaged so that electrochromism is not exhibited. Alternatively or in addition, intrinsic TCO properties resulting from its composition or morphology may cause such defects. In some electrochromic devices where halos were observed, silver was found in fissures or defects of the top TCO, and cross-sections of these defects showed that silver not only builds up within these fissures, but may be embedded near the glass substrate, suggesting that the silver may have migrated towards the bottom TCO, eroding portions of the EC stack and the bottom TCO.

Figure 2:
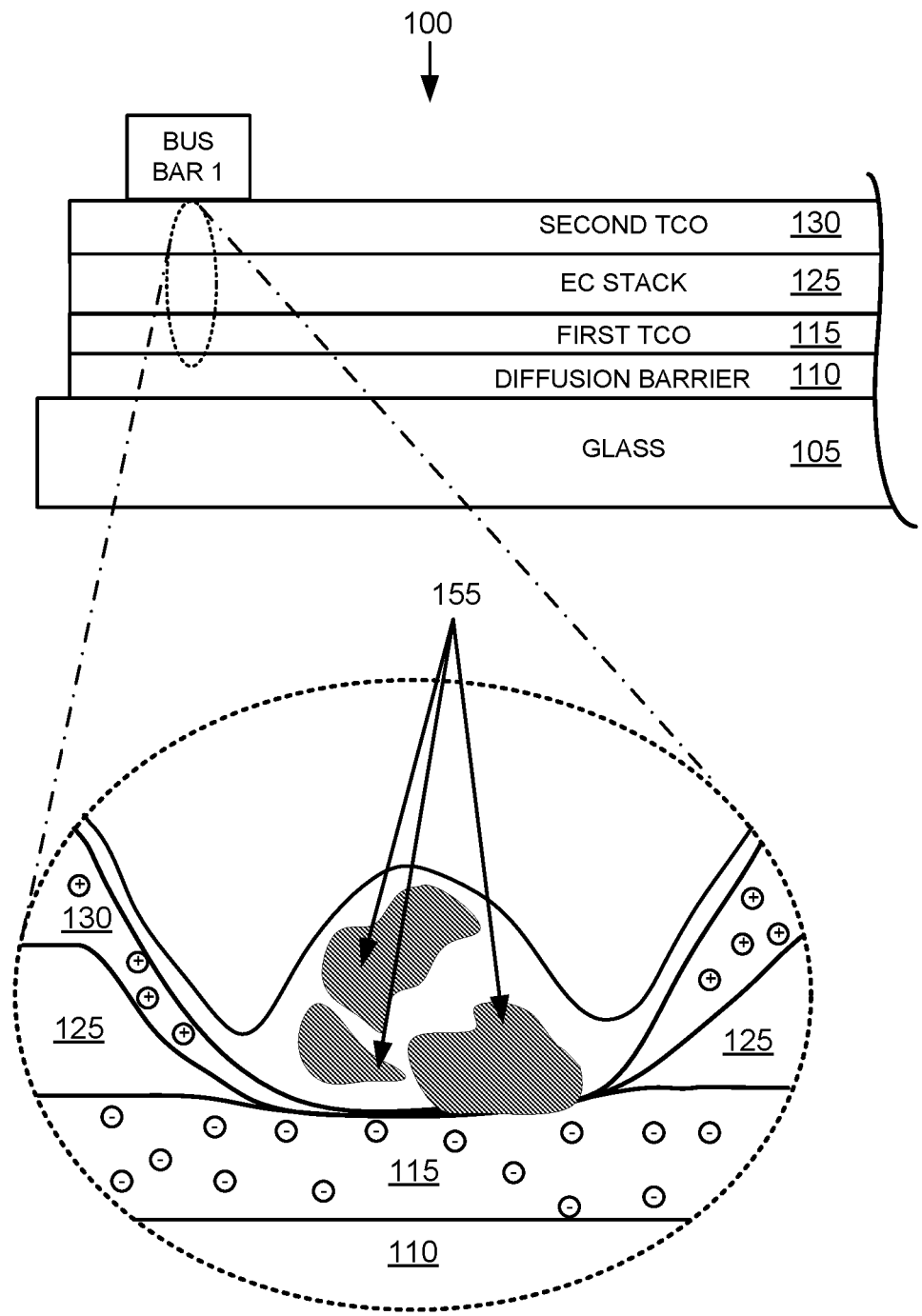
FIG. 2 is a schematic representation of an example of silver build-up in an electrochromic device.

FIG. 2 is an illustration depicting an example of a cross section of an electrochromic device 100 where a halo was observed. In the example of FIG. 2, the electrochromic device 100 was fabricated with layers such as that shown in FIG. 1A, with a silver ink bus bar 1 applied on an the second TCO 130 and above active device area of the electrochromic device 100, i.e. an area (from a top or plan view perspective) or region (volume of the aforementioned area) that actively switches. An expanded portion of the figure illustrates a problem overcome by certain disclosed embodiments. The expanded portion depicts build-up of silver 155 on top of the second TCO 130. The layers surrounding silver 155 are provided to facilitate imaging and are not part of the device 100. Silver 155 has migrated to the extent that the second TCO 130 has substantially eroded at the interface with EC stack 125. Likewise, the EC stack 125 has eroded where silver 155 has accumulated, and the first TCO 115 has partially eroded at the top surface. In normal operation, the unwanted physical connection between the second TCO 130, the silver 155, and the first TCO 115 may form an electrical short circuit. These shorting issues cause the formation of halos. Bus bars are conventionally deposited using a liquid-based ink, such as silver ink. Without being bound by a particular theory, it is believed that silver or other conductive bus bar material migrates through defects or fissures in the second TCO 130, and through the EC stack 125, eroding or even etching the bottom TCO 115. Possibly the bus bar conductive material penetrates the second TCO 130 by electromigration. Electromigration is the transport of material caused by the gradual movement of the ions in a conductor due to the momentum transfer between conducting electrons and diffusing metal atoms. Regardless of the actual mechanism, conductive materials may erode and/or migrate in certain active device regions under bus bars causing electrical shorts.

Certain electrochromic devices avoid these shorting problems by deactivating what would otherwise be active electrochromic device material under the top bus bar or excluding active electrochromic device under the top bus bar. For example, the region under the top bus bar may be free of an electrochromic layer and/or a counter electrode layer. Alternatively, in some cases, electrochromic devices are fabricated such that the first TCO and, optionally, the diffusion barrier in the area directly below the top bus bar is deleted prior to coating the EC stack and top TCO. In another approach, the fabrication process applies scribe lines to the bottom TCO prior to coating. This electrically isolates the lower TCO in the region of the upper bus bar and prevents the negative effects of shorting from the upper bus bar. Regardless of how the deactivation is accomplished, the electrochromic device under the top bus bar does not undergo tinting. This is beneficial but requires that the intended location of the bus bars be known before depositing EC stack. Only with this knowledge can the process be tailored to exclude or delete the first TCO or EC layer(s) under the top bus bar. These methods are referred to as "pre-patterning" methods since the pattern of the bus bars is known prior to fabrication of the electrochromic device. This is fine for some applications, but not for applications where the manufacturer needs to preserve flexibility in location of fabrication of optically switchable windows on large sheets or rolls of coated electrochromic glass. Some patterning methods are described in U.S. patent application Ser. No. 14/362,863, filed on Jun. 4, 2014, titled "THIN-FILM DEVICES AND FABRICATION," which is herein incorporated by reference in its entirety.

Patterning is defined as a process for altering, modifying, treating, depositing material on, removing material from, or otherwise determining and/or defining some regions of an electrochromic device. Patterning may be conducted in conjunction with determining the sizes of electrochromic devices or lites (sometimes called "panes") to be cut in subsequent processing. Patterning included locally modifying a globally deposited EC device, which may include any one or more of the following: (1) applying bus bars, (2) locally removing material, (3) locally deactivating regions of the electrochromic device, (4) locally mitigating shorts, and (5) locally activating regions of the electrochromic device while leaving other regions inactive.

Other methods to avoid this problem have involved depositing the bottom TCO on the substrate, moving the substrate from the deposition chamber to a separate patterning chamber to pattern the bottom TCO so as to delete portions of the bottom TCO where the bus bars will be applied, and moving the substrate with the patterned bottom TCO back into the deposition apparatus to continue coating the rest of the device. However, these methods use an air break in the deposition apparatus, reducing throughput and increasing processing complexity. These methods also require pre-patterning the glass, so they lose significant flexibility.

Some of the fabrication techniques are known as "cut-then-coat" techniques because the glass substrate is cut to a predetermined size prior to coating. Unfortunately, the coating apparatus, which is often a sputtering apparatus, may not be optimized for all glass sizes, and processing would be improved using a process employing only large format glass substrates of a single size. Various embodiments disclosed herein allow fabrication of EC stacks on large format glass substrates and subsequently define bus bar patterns for windows or other structures of any size and shape, whether the large format or something smaller. Certain embodiments concern "coat, ship, then cut" where a large format sheet is coated with an electrochromic device in one facility, packaged and shipped to another facility for post-processing and/or patterning.

Some conventional electrochromic device fabrication techniques employ glass substrates pre-coated with a bottom TCO layer and optionally a diffusion layer. Such substrates limit design and fabrication flexibility by fixing the chemistry of the bottom TCO to the chemistry of the layer as deposited by the manufacturer. Various embodiments disclosed herein allow fabrication of EC stacks with TCO layers chosen by the electrochromic device manufacturer and/or deposited by the electrochromic device manufacturer.

Provided herein are methods of mitigating defects in electrochromic device fabrication under a top bus bar. Some fabrication methods described herein form EC coatings without pre-patterning and yet do not suffer from the problem of shorting under the bus bar. In these methods, the resulting electrochromic devices do not form short circuits regardless of where a top bus bar may be applied after coating. In certain embodiments, bus bars may be applied at any location over the entire electrochromic device during post-patterning. Post-patterning is defined as a process performed after layers of the electrochromic device are deposited. In various embodiments, post-patterning is the first time that boundaries of an electrochromic device or lite are defined and bus bars are applied. It may be the first time that local processing occurs, such as application of heating in local areas where a bus bar is or will be applied. A coating apparatus may permit only processes that impact the entire area, or nearly the entire area, of the substrate. In some embodiments, post-patterning includes determining where bus bars will be applied. Post-patterning may be performed by a distributor at a different site from the location where the electrochromic device is coated. The methods described herein also provide flexibility in manufacturing processes. That is, in some embodiments, one facility may fabricate the electrochromic stack on a glass substrate without pre-patterning, the substrate with the EC stack may be shipped to a second facility, and post-processing and/or post-patterning may be performed in the second facility. Post-processing operations may include applying bus bars, cutting, laminating and/or fabricating an IGU (IGUs may have laminates as their inboard and/or outboard lites and laminates may be used as glazings in lieu of IGUs).

Post-patterning operations may also include deactivating a region of the electrochromic device, such as by sensitizing the stack by performing a treatment such as applying heat, irradiating, applying a chemical or composition, and combinations thereof. Deactivation may be performed before or after applying the one or more bus bars. In some embodiments, post-patterning includes performing a short mitigation operation that prevents shorts or removes shorts, such as by applying a bus bar made of material that is resistant to electromigration or performing other operations described herein. Other examples of short mitigation operations that may be performed in post-patterning include depositing an insulating cap over the second TCO prior to applying bus bar on the second TCO.

In some embodiments, deactivation or mitigation is performed after the electrochromic device is fabricated. Deactivation methods or mitigation methods may be performed after the IGU is fabricated without performing deactivating or mitigating operations during fabrication of the IGU. In such methods, blanket coatings may be used for the electrochromic device using conventional chemistry and techniques, and the IGU may be fabricated using conventional techniques before regions where the bus bars are applied are deactivated. For example, in some embodiments, a fabricated IGU may be treated with a laser to deactivate regions of the IGU where bus bars are applied. In some embodiments, these processes may be performed before or after bus bars are applied.

In certain methods described herein, the layers of the electrochromic device coating including the bottom TCO, EC stack (including the EC layer, optional IC layer, and CE layer), and top TCO are deposited first in, for example, a vacuum-integrated reactor. Subsequently, in some embodiments, the substrate is cut into smaller windows during post-patterning. Regardless of whether the substrate is subsequently cut, the bus bars and co-located device features as described herein may be formed after the coatings are applied. As used herein, the term "location" or "region" is defined as an area on the electrochromic device and may refer to any one or more of the electrochromic device layers in that area. It may be defined by the area of a feature on the electrochromic device such as a bus bar, and in such cases it includes not only the portion the electrochromic device directly under the feature, but also portions that extend out some distance from the perimeter by, for example, a few millimeters or so, e.g. up to about 5 mm or 10 mm, but typically between about 0.5 mm and about 5 mm, or between about 0.5 mm and about 2 mm, or between about 0.5 mm and about 1 mm, or between about 0.1 mm and about 3 mm, or between about 0.1 mm and about 2 mm, or between about 0.1 mm and about 1 mm. A location where the top bus bar is applied is a location that may be specified during post-patterning and electrochromic device layers under such a location may be designated as an area where the top bus bar will be applied; i.e., the area under or coincident with the top bus bar. In the following discussion, the phrases "under the bus bar" or "under the top bus bar" may be used to refer to such a location.

The approaches disclosed herein provide flexibility in applying the bus bar after coating and may be referred to as a "coat-then-cut" technique. Certain methods described herein may be performed such that coated glass may be manufactured in bulk at one place and patterned in a different location and possibly by a different entity, such as an end user or downstream glass supplier. Certain aspects of coat-then-cut are described in U.S. patent application Ser. No. 13/456,056, filed on Apr. 25, 2012 and titled "ELECTROCHROMIC WINDOW FABRICATION METHODS," which is incorporated herein by reference in its entirety.

Many processes provided in this disclosure fall into one of two general categories: (1) processes that deactivate the electrochromic device in the area under the location where the top bus bar will be applied or has been applied, and (2) processes that prevent shorting in the electrochromic device while leaving the electrochromic device active under the top bus bar. Within the first category are processes producing devices that are partially deactivated but which nevertheless tint and clear to some degree, sometimes in a manner not significantly perceptible by occupants. For example, a method may deactivate a region of the device by reducing the lower TCO's conductivity under the top bus bar, but otherwise leaving the EC stack unmodified. If the deactivated region of the lower TCO is sufficiently thin, the device stack over top of it may tint or clear when exposed to sufficiently large potential from the lower TCO surrounding the deactivated region. As explained below, in the second category, approaches used to prevent shorting without pre-patterning include equipment-based solutions, materials-based solutions, and process-based solutions.

Inactive Device Under Bus Bar

Certain embodiments mitigate shorting in electrochromic devices involve processes that deactivate locations in the electrochromic device in the area under the top bus bar. Such deactivation may be performed on any one or more of the layers under the top bus bar except the top TCO because the top TCO is used to facilitate tinting and clearing of the electrochromic device when a potential is applied. The deactivation approaches described herein may allow post-patterning such that the coatings on the electrochromic device may be fabricated without determining where the top bus bars will be applied on the electrochromic device.

Once deactivated, a deactivated portion may not undergo tinting. Thus, when a voltage applied to the electrochromic device, the deactivated area will be clear. Note in some embodiments, an area in close proximity to the deactivated area may still tint when a potential is applied. A deactivated area will not form a short circuit, thereby eliminating the formation of halos. In some embodiments, since the areas where bus bars are applied are masked by a spacer on the window or IGU, the deactivated area will not be visible to a user.

Deactivation methods may be performed during and/or after depositing layers of the electrochromic device. In some embodiments, deactivation is performed during post-patterning, which includes applying bus bars and cutting the electrochromic device into smaller units after the EC device is completely fabricated.

In some embodiments, methods are performed during deposition such that a treatment is applied to a global portion and a subsequent deactivating step is applied to a local portion of the electrochromic device during post-patterning. For example, in some embodiments, a region of the electrochromic device under the bus bar may be exposed to flash lamp annealing (FLA), which utilizes pulses of high energy light to quickly anneal the surface of a substrate and any coating on the surface. Such annealing method is distinct from conventional oven anneals, which heat the entire substrate. In some embodiments, a mask may be used over the regions to remain inactive to prevent such a region from being exposed to the flash lamp. Lasers may be used to achieve the same or similar result in certain embodiments.

Certain deactivation mechanisms will be described. Corresponding techniques for causing these mechanisms will be described later.

Deactivating the Device

An area of the device may be deactivated by "poisoning" the area, or destroying the area using mechanical, optical, or thermal processes. Poisoning is defined as chemically treating or chemically modifying a layer of the electrochromic device that renders the device inoperable or deactivated. In some embodiments, poisoning an area of the electrochromic device involves reacting or diffusing one or more chemicals to deactivate the area. For example, poisoning may be performed when applying the upper bus bar. In some embodiments, the poisoning method does not interfere with the deposition techniques for depositing the TCO layers or EC stack. Instead, poisoning is performed after the electrochromic device is fabricated. The electrochromic device in such cases may also be fabricated using conventional techniques. In some embodiments, the electrochromic device may be fabricated in a special manner that prepares one or more layers of the electrochromic device for poisoning at a later step, e.g., post-patterning. Note that such preparation techniques are applied during the coating process, and because many coating tools cannot vary coating conditions locally, with sufficient precision to affect only a small region where a bus bar will be applied, the process of a preparing a layer for poisoning is applied globally over the entire electrochromic device. Poisoning is performed later, only in locations where the bus bar will be applied, typically during post-patterning.

In some embodiments, an electrochromic device includes one or more layers that are deactivated as formed, but during subsequent post-patterning, are activated at locations on the electrochromic device where the top bus bar is not, or will not, be applied. In some embodiments, the electrochromic device is fabricated without an ion conducting layer such that when regions not under the bus bar are activated, ion conducting layers may be intrinsically formed. In one example, the device layers are deposited as an electrochromic device precursor. Electrochromic device precursors are described in U.S. Pat. No. 8,300,298, issued on Oct. 30, 2012, titled "ELECTROCHROMIC DEVICES," which is incorporated by reference herein for all purposes. Such electrochromic device precursors include layers and materials that, when the appropriate driving force is applied, form a functional electrochromic device. In one example an electrochromic device precursor is heated to form an ion conducting electrically insulating layer in situ, between the electrochromic and counter electrode layers. This technology uses super-stoichiometric oxygenated electrode materials, which may themselves be electrically insulating, though the device precursor is not a functioning electrochromic device. When e.g. heat is applied, at the interface between the abutted electrode layers, an ion conducting electronically insulating material is formed. Thus, by applying a driving force, e.g. heat, selectively to the device precursor stack, the functional electrochromic device is formed except where a top transparent conductor bus bar will be fabricated. For example, an IR heating element or hot probe may be used across an electrochromic device precursor such as by using an X-Y plotter system where a user may input coordinates of a device layout and apply heat in regions except where a top transparent conductor layer bus bar will be applied. In some embodiments, heat may be applied to a temperature greater than about 500° C. in a few milliseconds. In another example, a flash lamp anneal may be used to anneal coating on the surface of a substrate without substantially heating the substrate to activate regions not under the bus bar. The resulting device is may be functionally identical to the case where an active electrochromic device is selectively deactivated in areas where the top TCO bus bar will go, or under existing top TCO bus bars. Therefore, the discussion herein of selectively deactivating regions under the bus bars may, in appropriate contexts, be viewed as producing electrochromic devices equivalent to those produced by selectively activating regions but for regions where bus bars are or will be fabricated on the top transparent conductor.

In some embodiments, an electrochromic device may be substantially deactivated.

Substantially deactivating an electrochromic device typically results in reducing or eliminating a device's electrochromic function or capability to the extent that the substantially deactivated region of a device does not change optical state when a potential sufficient to change state in a functioning electrochromic device is applied. Electrochromic capability is a device or material's capability to respond to a change in applied potential by changing an optical property such as color or degree of tinting.

As examples, a layer or device may be deactivated by destroying or suppressing: (1) mechanical properties of the device, (2) ionic and/or electronic conductivity of the device, or (3) electrochromic functioning of the device.

The mechanical properties of an area of the electrochromic device where the bus bar will be applied may be degraded or destroyed by physically preventing the area of the electrochromic device from functioning. Examples of mechanical methods include applying pressure or grinding the area. In such a mechanism, the structure of the electrochromic device under the bus bar is destroyed. If an area under the bus bar on the bottom TCO is mechanically degraded, even if silver were to migrate from the top bus bar towards the bottom TCO, a short circuit would not form. In some embodiments, mechanical degradation is performed locally such that pressure is applied in a direction normal to device layers or by shearing action or grinding to render the device deactivated in the local area. In some embodiments, the properties of the top TCO may be tailored to be conducive to a mechanical stress, that is will not break or otherwise degrade while the underlying layers will. Examples may include using a pyrolytic FTO, which is much harder than the underlying electrochromic device; or a very flexible top TCO while the underlying EC stack remains brittle or compressive. In other embodiments, mechanical degradation is performed by selective absorption of optical or thermal energy by device layers under the upper TCO. For example the device layers may absorb certain wavelengths of laser or other energy and/or such energy can be selectively focused in one or more of the underlying layers and not in the top TCO. In some implementations, mechanical degradation is performed by selectively heating EC stack layers without degrading the upper TCO, which should be preserved for delivering electrical potential and current from the upper bus bar to the entire surface of the device.

In one embodiment, alternating current is applied or induced in a localized area of the device to inactive the device under the bus bar. Inductive coupling may be used selectively in an area of the device. For example, TCO's can inductively couple to receive alternating current and provide heating in the area to deactivate the EC stack therebetween. Magnetic fields may be applied to intensify the inductive effect in the localized area. Inductive coupling may be achieved locally/selectively using probes proximate the coating, on one or both sides of the substrate it's on. This may be done in a high-through put fashion The ionic and/or electronic conductivity of an area of the electrochromic device where the bus bar will be applied may be limited or reduced by various mechanisms. In some embodiments, the conductivity may be inhibited by chemically reacting the conductive material, such as the bottom TCO material, to yield sufficiently resistive material which poisons the electrochromic device. Examples of mechanisms and materials for chemically modifying the conductive material include oxygenation, halogenation, ozonation, hydration (application of water, e.g. steam, optionally followed by dehydration (drying) the area to remove unwanted or excess moisture) and the like. For example, an electrochromic device may be locally deactivated by displacing fluorine in the TCO with oxygen. In another example, a different halide, such as chloride, bromide or iodide, may be used to displace fluoride in a tin fluoride-based TCO. Displacement of fluorine may be performed by depositing an oxygen-containing layer, such as a titanium oxide layer, which serves as a source for oxygen to diffuse into the TCO when thermally activated to locally deactivate a location on the electrochromic device. Halogenation with other than fluoride (or over fluorination to kill activity) can be performed with halogen gases or compounds that are halide sources under the appropriate conditions (e.g. phosgene is a powerful chlorinating agent). In some embodiments, a high oxygen content layer at the glass-to-TCO interface could be treated to locally deactivate a location on the electrochromic device. In some embodiments, a high concentration of oxygen is provided in the bottom TCO to poison the bottom TCO by inhibiting its conductivity. The local poisoning (under the top bus bar) by high oxygen (or other contaminate or oxygen source such as perchlorate, ozone, phosphates, sulfonates and the like) concentration may be performed by delivering the oxygen from a source outside the EC stack—typically during post-patterning—or from within the EC stack followed by local activation to increase the oxygen concentration under the top bus bar. Various oxygen sources or donor may be employed. In some embodiments, the oxygen is provided by the underlying substrate itself or some layer formed during coating. In one example, the bottom TCO includes fluorinated tin oxide material, which is locally altered upon heat treatment during post-processing to increase oxygen concentration in an area of the electrochromic device, to inhibit conductivity. Oxygen sources include the layers of the device themselves (whether through their native composition or through an oxygen-rich form created by providing excess oxygen during deposition), the bus bar material, or other source.

Oxygen may reduce conductivity by various mechanisms. In one case, oxygen forms a passivation layer on or within the lower TCO. In some embodiments, the passivation layer may be on a different layer of the electrochromic device. The passivation layer may be produced by a reaction between the TCO material and some external material such as the bus bar material. In some cases, TCO conductivity is reduced by an internal chemical or morphological modification (e.g., a reduction in crystallinity or more grain boundaries) caused by altering the substrate temperature or other process.

Embodiments where a high concentration of oxygen deactivates the bottom TCO by reducing conductivity may be practiced in combination with local post-treatment methods as described below. For example, during treatment of a fabricated electrochromic device, a high concentration of oxygen is provided in the locations where the bus bars have been or will be applied by performing a local post-treatment method described below.

In various embodiments, sources of 'poisons' such as oxygen and sodium come from some layer(s) within the EC stack and/or the substrate itself. For example, a WB layer used in an EC stack is super-stoichiometric with a chemical formula of about $WO_{3.3}$. Without being bound by a particular theory, it is believed that excess oxygen exists within the structure and is not bound to W atoms. It may be possible to use a laser to "activate" this excess oxygen to poison the electrochromic device in a local portion, such that the electrochromic device under a region where a top bus bar will be applied has a composition of about $WO_{2.8}$ to below about $WO_3$. A similar process could be used to change the stoichiometry of sodium or other alkali metal present in the soda lime glass substrate to deactivate the bottom TCO or lower its electrical conductivity.

The electrochromic activity of an area of the electrochromic device may be inhibited or eliminated by reacting interstitial oxygen in a tungsten oxide matrix of the EC stack to produce an oxygen-rich form of tungsten oxide, which is not electrochromically active and thereby deactivates the electrochromic device. For example, electrochromic tungsten oxide may have a substoichiometric formula of $WO_{2.8}$, whereas $WO_3$ is non-electrochromic. Such a reaction may be performed in connection with a post-treatment such that the locations of the electrochromic device where the top bus bars will be applied are exposed to excess oxygen and locally heated. In some embodiments, local heating of the electrochromic device in the area is enough to convert electrochromic tungsten oxide in that area to non-electrochromic WO$_3$ to inhibit or eliminate the electrochromic activity without exposing the device to excess oxygen.

In some embodiments, lithiation of one or more layers of the electrochromic device is altered or modified in the locations, thereby inhibiting conductivity the electrochromic device. For example, lithium may be consumed to render the area under the bus bar inactive, or structures may be formed in a location during post-patterning such that the structure cannot support lithium transport, such as a thicker IC layer formed by localized chemical modification in the area.

Methods of Deactivation

Figure 3:
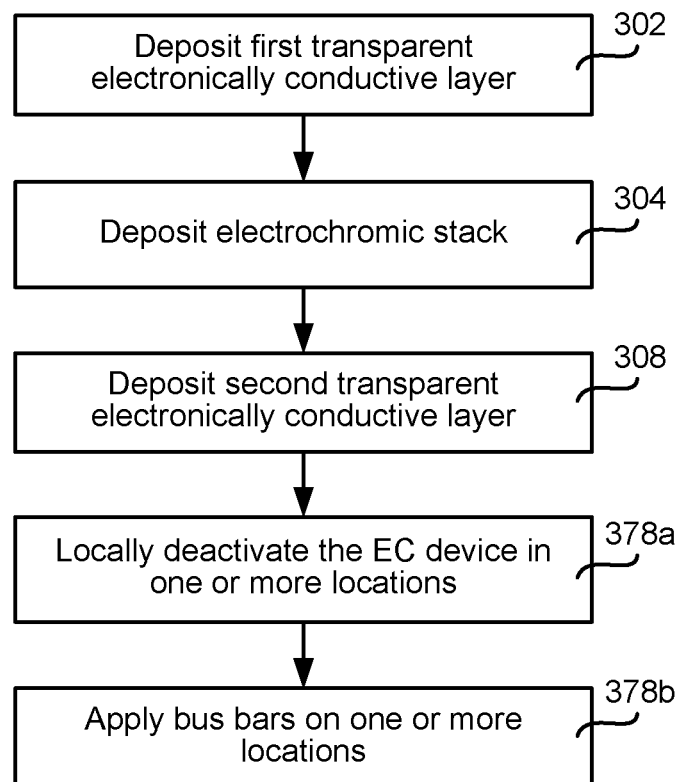
FIG. 3 is a process flow diagram for operations performed in accordance with disclosed embodiments.

This section describes methods of locally deactivating the electrochromic device under a top bus bar. These methods may cause any one or more of the results described above (e.g., mechanical destruction, lower TCO conductivity, or loss of electrochromic function). In various embodiments, the deactivating method is accomplished during coating to form the electrochromic device and/or during a post-coating treatment. FIG. 3 is a flow chart depicting a fabricating method for an electrochromic device, where the method includes deactivating areas under the top bus bar. In operation 302, a first TCO layer, or bottom TCO, is deposited on a glass substrate. In some embodiments, a substrate is provided with the bottom TCO layer already deposited. For example, float glass is sometimes provided with a thin layer of fluorinated tin oxide, sometimes called a FTO layer. In operation 304, the EC stack is deposited on the bottom TCO layer. The EC stack may include layers as described above with respect to FIGS. 1A-1C. Variations on the stack fabrication process may be employed such as described in U.S. patent application Ser. No. 13/763,505, filed Feb. 8, 2013 which is incorporated herein by reference in its entirety. In operation 308, a second TCO layer, or the top TCO may be deposited on the EC stack. Performing operations 302, 304, and 308 form the electrochromic device, and such coatings may be performed in a single apparatus.

In some embodiments, a material may be delivered to the partially fabricated electrochromic device during operation 302, 304, or both, which sensitizes the layers prior to local deactivation in a subsequent operation, e.g., a post-patterning operation. In addition or alternatively, the partially fabricated electrochromic device may be treated to sensitize one or more layers. Regardless of the sensitization mode, the entire surface of the device is typically treated because sensitization typically occurs in the electrochromic device fabrication apparatus, where a significant fraction of the substrate is coated by sputtering or other process. The term "sensitize" is generally used to describe a process of rendering some or all of an electrochromic device susceptible to deactivation during post-processing upon local application of a stimulus such as a delivery of chemical or other material to the electrochromic device, application radiation or heat, laser energy, and application of a force. In some implementations, a sensitizing operation is performed during coating operations, which may coat all or nearly all the area on the substrate. In such implementations, the sensitizing operation may affect regions of the electrochromic device outside the region near a bus bar, where the post-processing modification occurs. Post-processing may deactivate or otherwise modify the sensitized electrochromic device only in the region under the bus bar. Thus, sensitization represents one phase of a two phase process, where sensitization occurs globally and a local post-processing deactivation step convert the sensitized device to a locally deactivated device. Examples of sensitization processes include depositing layers of poison precursors or encapsulated poisons, exposing the area to oxidants, reductants, halides, water vapor or other liquid or gaseous materials to either deactivate or prepare the area for deactivation, exposing the area to electromagnetic radiation, laser, microwaves or the like, ultrasonic or hypersonic energy may also be used; and combinations thereof.

Operations 378a and 378b are sometimes referred to as post-patterning processes. In some embodiments, operation 378a may be performed before or after operation 378b. In operation 378a, one or more locations of the electrochromic device are locally deactivated. Depending on the deactivation mechanism, such local deactivation is performed on a sensitized or unsensitized electrochromic device. In many embodiments, operation 378a includes treating device areas where the top bus bars will be applied, are being applied, or have been applied. In some embodiments, a local deactivation treatment is performed as a part of normal electrochromic device fabrication. Example treatments include heating, applying radiation, mechanical treatment, chemical treatment, or any combination thereof. In operation 378b, bus bars are applied in one or more locations. The top bus bars are applied in the locations that are locally deactivated in operation 378a, thereby forming a device with bus bars where the device is deactivated under the top bus bar. In some embodiments, operations 378a and 378b are performed together, as a single operation. In other words, formation of the top bus bar in 378b deactivates the underlying device in 378a. One example of such dual purpose operation involves applying the bus bar as a liquid containing a material that diffuses or flows to the underlying electrochromic device and there locally deactivates the device. In another example, the bus bar is applied with mechanical pressure that locally deactivates the underlying electrochromic device. Mechanical pressure may be accompanied by heating or other application of electromagnetic radiation and/or application of one or more poisoning agents as described.

Local heating methods used to deactivate the electrochromic device in operation 378a may include contacting areas of the electrochromic device with (1) laser irradiation or another focused non-coherent radiation, (such as a UV, visible, or IR source), (2) a solid heating element, or (3) flash lamp annealing (FLA). In flash lamp annealing, high frequency Xe lamps can, for example, anneal films in μsec that may otherwise take minutes in conventional approaches. One advantage is that flash lamp annealing locally heats the film stack without heating the substrate. These methods may be performed before, during, or after application of the top bus bar. Local heating methods may use thermal energy to deactivate the electrochromic device. Such heating may cause the area heated to be more resistive, thereby reducing or eliminating the possibility of a short circuit forming in that area of the electrochromic device. For example, an area of the substrate may be heated to a high temperature, such as over about 200° C. or over about 600° C.

A suitable apparatus for heating the electrochromic device may be a laser scribe tool. Examples of laser scribing can be found in U.S. patent application Ser. No. 12/645,111, titled "FABRICATION OF LOW DEFECTIVITY ELECTROCHROMIC DEVICES," filed on Dec. 22, 2009, U.S. patent application Ser. No. 13/456,056, titled "ELECTROCHROMIC WINDOW FABRICATION METHODS," filed on Apr. 25, 2012, and PCT Patent application No. PCT/US2012/068817, titled "THIN-FILM DEVICES AND FABRICATION," filed on Dec. 10, 2012, which are hereby incorporated by reference in their entirety. Flash lamps, infrared heaters, quartz lamps, induction coils, microwave generators, UV lamps, and the like may also be used.

Various elements are relevant when implementing a laser pattern. First, a distinction may be drawn between a laser tool and a scanner. A scanner is typically part of a laser tool. The scanner can shine and direct a laser beam according to the pattern provided to the scanner. The scanner itself is not aware of its position at a given time relative to the workpiece. A programming code is typically used to provide instructions that direct the laser tool to position the scanner relative to the workpiece. In various embodiments, this code is used to reposition the scanner after a pattern has been executed and to direct the scanner to undertake the next pattern, thereby ensuring that the scanner performs the next pattern at the correct portion of the workpiece. The scanner receives instructions (typically in the form of a programming code) defining a pattern or patterns that the scanner will use to shine and direct the laser beam according to the pattern or patterns. The laser tool receives instructions detailing where to position the scanner relative to the workpiece. These instructions may contain information regarding the timing and positioning of various processes/components.

The laser or lasers used for the laser scribe processes are typically, but not necessarily, pulse-type lasers, for example, diode-pumped solid state lasers. For example, the laser scribe processes can be performed using a suitable laser. Some examples of suppliers that may provide suitable lasers include IPG Photonics Corp. (of Oxford, Mass.), Ekspla (of Vilnius, Lithuania), TRUMPF Inc. (Farmington, Conn.), SPI Lasers LLC (Santa Clara, Calif.), Spectra-Physics Corp. (Santa Clara, Calif.), nLIGHT Inc. (Vancouver, Wash.), and Fianium Inc. (Eugene, Oreg.).

Exemplary electromagnetic radiation includes UV, lasers, and the like. Laser wavelength may vary, such as from about 532 nm to about 10 µm, or about 1064 nm to about 10 µm. Wavelength used to heat is different from that used in removing material on a substrate. Laser irradiation is delivered to the substrate using, e.g. optical fiber or open beam path. The heating can be performed from either the substrate side or the EC film side depending on the choice of the substrate handling equipment and configuration parameters. The energy density required to heat the film may be achieved by passing the laser beam through an optical lens. The lens focuses the laser beam to the desired shape and size to heat a specific region on the substrate. In one embodiment, a "top hat" beam configuration is used, e.g., having a focus area of between about 0.005 $mm^2$ to about 2 $mm^2$. In one embodiment, the focusing level of the beam is used to achieve the required energy density to heat the EC film stack. In one embodiment, the energy density used in the heating is between about 2 $J/cm^2$ and about 6 $J/cm^2$.

In some embodiments, the substrate may receive local irradiation in one or more locations on the electrochromic device, typically under the top bus bar, such that light energy deactivates the electrochromic device. Local irradiation may be delivered by a laser having an appropriate wavelength such as a UV, visible, or IR laser. Non-laser sources such as incandescent or arc lamps may be employed with a focusing element to deliver the radiation onto the device a precise location. In another example, a positive or negative mask is used during post-patterning, followed by irradiation by a laser or UV source to the exposed areas. The exposed area may be the locations where bus bars will be applied, or the locations where bus bars will not be applied (e.g., where the electrochromic device will be active). Various deactivation mechanisms may occur upon local exposure to radiation. In one example, UV radiation breaks down cross-linked polymers present in the electrochromic device and/or deactivates or destroys chromophores responsible for electrochromic activity in the device.

Another technique for locally deactivating an electrochromic device involves chemically post-treating one or more locations on the electrochromic device. The chemical may be delivered locally during post processing or globally (as a precursor or contained material) during electrochromic device fabrication in a coating apparatus. In some embodiments, a chemical post-treatment includes applying a bus bar using material that when contacting the EC stack or bottom TCO, deactivates the contact area. In some embodiments, the chemical may be delivered via a vehicle other than the bus bar. Examples include application of the chemical directly via spraying a liquid, screen printing, bubble jet printing, application of a gaseous chemical via a localized nozzle or manifold or plenum that e.g. makes contact with the electrochromic device coating and forms a temporary closed volume. The closed volume is filled with the gaseous chemical and then evacuated or flushed after the appropriate exposure is achieved. The manifold or plenum may be moved away from the device thereafter or in order to vent the volume. In some embodiments, the post-treatment is performed on a stack including a material deposited globally during electrochromic device coating, such as in operation 302 or 304. For example, sodium-based pastes are deposited, and subsequently treated in an area where the bus bar will be deposited to cause the sodium to come in contact with and deactivate that area of the device. Other examples post-deposition chemical poisons include halogenating agents, sulfates, oxides, peroxides, phosphates, water, sulfides, hydroxides, amines, hydrazine, ammonia, acids, and bases. It is known that tungsten oxide swells substantially when hydrated or otherwise reacted with aqueous based materials, thus in embodiments where deactivation is achieved by such means, careful consideration is taken as to the stoichiometry of the material applied. For example, if water vapor is used, the delivery mechanism is precise, otherwise the swelling could destroy not only the electrochromic device activity but also the top TCO. In some implementations, the globally sensitized device is laser treated locally to release the chemical or convert its precursor to a "poison". These "poison" methods may, in some implementations, inhibit conductivity of the electrochromic device as described above.

In some implementations, a combination of the above described post-treatments and/or coating methods may be used to deactivate an area of the electrochromic device. For example, a chemical "poison" or precursor may be applied globally before or during coating of the electrochromic device, while the heat post-treatment may be applied selectively at the location of the bus bars after coating and prior to applying the bus bars. In this example, the combination of heat and chemical poisoning serves to deactivate the device.

Deactivation Illustration 1

The electrochromic device may be fabricated by exposing either the bottom TCO or another layer of the EC stack to a chemical "poison," such as oxygen, while the layer is being deposited. For example, a sensitized bottom TCO may be fabricated by exposing a glass substrate to reactants for forming fluorinated tin oxide or indium tin oxide while intermittently exposing the substrate to doses of excess oxygen or ozone, for example. During post-patterning, a co-stimulus, such as heat by laser irradiation, may be applied to the one or more locations to deactivate the electrochromic device in the one or more locations. In this example, the combination of a higher concentration of oxygen in an area of the electrochromic device that is also heated deactivates the device. Although oxygen doses may have been applied globally to the entire electrochromic device during fabrication (coating), only the areas where the co-stimulus is applied are deactivated.

Deactivation Illustration 2

A glass substrate is provided to a processing apparatus where a bottom TCO is deposited on the glass substrate. In some embodiments, the bottom TCO material is fluorinated tin oxide or an indium tin oxide. After the bottom TCO is deposited, the bottom TCO may be exposed to a sodium compound to sensitize the surface of the substrate. Subsequently, the EC stack is fabricated over the sodium-containing layer. For example, tungsten oxide may be fabricated over the sodium-containing layer. A top TCO is then deposited to form the electrochromic device. During post-patterning, areas where the bus bars will be applied are locally deactivated with a laser to heat the device to a temperature up to, for example, 800° C., to activate the sodium compound to thereby poison the fluorinated tin oxide and rendering the area deactivated. In some examples, exposing the areas to a laser may also break through a sodium diffusion barrier to further poison the fluorinated tin oxide. Conditions are set using localized heat such that the amount of sodium from the glass substrate may break through a barrier between the glass substrate and the first TCO and into the electrochromic device to deactivate it.

Deactivation Illustration 3

The electrochromic device may be fabricated by exposing either the bottom TCO or another layer of the EC stack to a light or thermal source, such as a laser or UV, while the layer is being deposited. For example, a sensitized bottom TCO may be fabricated by exposing a glass substrate to reactants for forming fluorinated tin oxide while intermittently exposing the substrate to doses of UV exposure. After the rest of the electrochromic device is fabricated, one or more locations on the electrochromic device may be determined as locations where the bus bars will be applied. During post-patterning, a co-stimulus, such as a chemical poison, may then be applied to the one or more locations to deactivate the electrochromic device in the one or more locations.

Deactivation Illustration 4

The electrochromic device coating may be fabricated as usual, e.g. on a large sheet of glass with no pre-patterning. The electrochromic device coated glass may be post-processed at the same facility or shipped to another facility for post-processing. Prior to, or after cutting, electrochromic lites from the large sheet, one or more layers of the coating under the top TCO are deactivated by selective application of electromagnetic radiation to the area(s) where top bus bars are to be applied. For example, laser irradiation selectively deactivates one or more underlying layers in the selected area(s). Post-processing may also include laser edge deletion, (lower) bus bar pad expose, and laser isolation scribes if warranted—these further post-processing steps, individually or collectively, can be performed before or after the lites are cut from the mother sheet.

Active Device Under Bus Bar

Figure 4A:
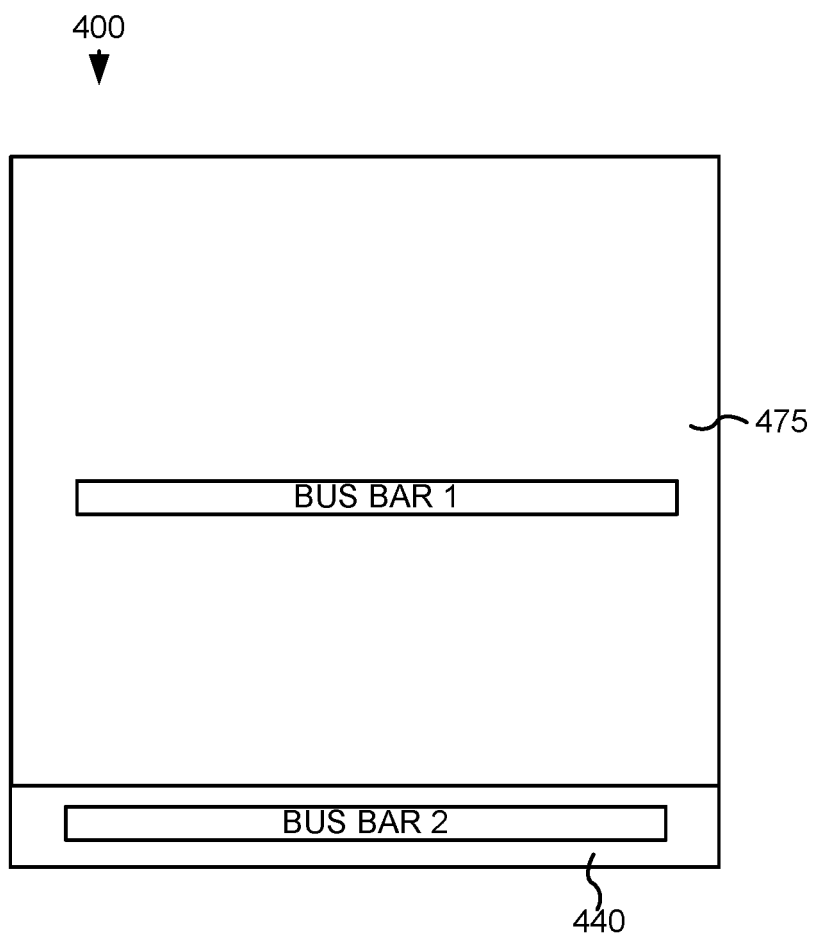
FIG. 4A is a schematic representation of an example of bus bars applied on an electrochromic device.

This section describes methods for fabricating electrochromic devices that mitigate local shorting between the top bus bar and bottom TCO without deactivating the electrochromic device under the top bus bar. The associated devices are also described. In these methods, the device area under the top bus bar can undergo tinting without producing the problematic halos described above. A short mitigation operation may be employed to prevent formation of shorts and/or remove or reduce the negative effects of shorts that are already present. In various embodiments, the methods may be performed in a coat-then-cut procedure, so some or all of the fabrication is performed before taking steps required to designate the bus bars locations. Therefore, bus bars locations may be first defined after coating, during a post-patterning phase. The processing provides flexibility to locate the bus bars on any window and at any location within a given device, including in the viewable or interior regions of the device such as the middle of a window. FIG. 4A shows an example of the top view of an electrochromic device where bus bar 1 is placed in the interior of the viewable region of a window unit 400. Bus bar 1 is applied on the top TCO layer 475 in the interior region of the device, and bus bar 2 is applied on bottom TCO 440. In some embodiments, it may be desirable to place a bus bar in the interior region of a window to promote faster, more efficient, and/or more uniform optical switching. Where a bus bar is placed in the interior region, the bus bar may be preferably transparent and/or very thin, such as about 0.5 mm to about 2 mm in width microns in width. In some embodiments, the bus bars may be transparent. Transparent bus bars are further described in PCT International Patent Application No. PCT/US2014/72362 filed on Dec. 24, 2014 titled "OBSCURING BUS BARS IN ELECTROCHROMIC GLASS STRUCTURES," which is herein incorporated by reference in its entirety. The bus bars may be placed anywhere from being out of sight underneath the spacer to the viewable or interior region of the electrochromic window.

Short circuit mitigation methods where the electrochromic device tints under the top bus bar may be accomplished by any one or more of the following at least three categories of process: (1) modifying deposition of the top bus bar to reduce physical propensity for electromigration or other short formation mechanism, (2) healing shorts as they form or healing shorts shortly after they form or "self-healing" techniques as described herein, and (3) filling or blocking fissures in the top TCO that would otherwise become pathways to form short circuits. Note that in addition to fissures in the top TCO, conductive bus bar material may contact the bottom TCO through depressions, or missing pieces of the EC film stack, which are, for example, caused by foreign particulates on the substrate. These foreign particulates may land on or be incorporated into the substrate during the coating process.

Bus Bar Design and Application

This section presents examples of bus bar designs that reduce or eliminate shorting through electromigration or related phenomena in which conductive material from the bus bar leaves the bus bar and passes through the upper TCO and ultimately contacts the lower TCO. The problem was illustrated in FIG. 2 and the associated description. Examples of suitable designs include those in which the bus bar material is not susceptible to electromigration during normal operation, the bus bar conductive material is provided in a vehicle or substrate that prevents it from entering the defects or fissures of the underlying TCO or EC stack, and/or the bus bar has sufficient viscous nature to be substantially solid, such that it cannot fill the fissures or depressions in a region of the bus bar. In embodiments where the bus bar structure is modified as described herein, pinholes or fissures may still exist in the top TCO, but the bus bar material does not move into the pinholes or fissures of the top TCO, thereby mitigating formation of short circuits.

Figure 4B:
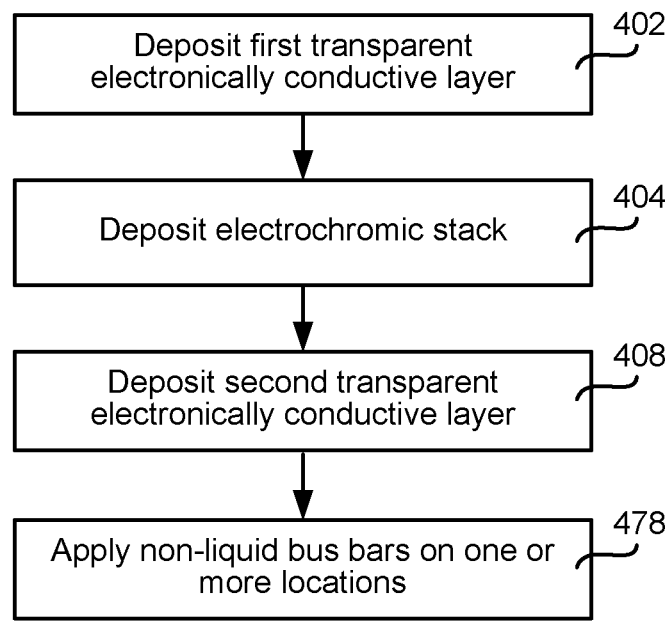
FIGS. 4B, 5, and 6 are process flow diagrams for operations performed in accordance with disclosed embodiments.

FIG. 4B is a flow chart of general operations that may be employed in fabricating an electrochromic device with a modified top bus bar. In operation 402, a bottom TCO is first deposited onto a substrate. In operation 404, the EC stack is deposited onto the bottom TCO. In operation 408, the second or top TCO is deposited on the EC stack. Note that these operations may be performed using any technique for depositing TCO and EC stack material to thereby form the electrochromic device as described herein and in the documents incorporated by reference. In operation 478, the bus bar (or multiple bus bars in certain embodiments) is applied on a location on the electrochromic device. This takes place during the post-patterning phase. Operation 478 is the focus of this section; it represents a departure from conventional bus bar designs and fabrication methods.

Conventionally, bus bars are provided as an ink or liquid medium which dries or hardens on the electrochromic device surface. During application, the liquid may penetrate into the underlying device through fissures or defects, carrying with it the conductive material. To address this problem, "non-liquid" bus bar materials may be used during fabrication. The concept of a non-liquid bus bar includes various immobile bus bar materials including solids, gels, highly viscous liquids, glasses, and the like. The material in such immobile bus bar does not substantially flow into any fissures on the top TCO; in other words it rarely, if ever, forms short circuits.

A viscous liquid may be, for example, a polymer-containing silver ink. Dry processing, sintering, and the like may be employed in which a powder or other solid phase bus bar material is affixed to the top TCO layer. Dry processing technology may employ solid mixtures of conductive bus bar materials and binders such as polymeric materials like PVDF and similar materials. In some implementations, a solid top bus bar is applied to the top TCO by adhesion, pressure from overlying structure such as a spacer, diffusion bonding, solder bonding, epoxy, cold metal flow under high initial contact pressure, or another technique. In some embodiments, a solid bus bar is a wire or a conductive strip or foil which may be held in place by pressure from an overlying structure or by adhesion to the top TCO. In some embodiments, immobile bus bar material is used for both the top bus bar and the bottom bus bar, while in some embodiments, the material for the top bus bar and bottom bus bar are different.

In certain embodiments, the bottom bus bar material deposited on the electrochromic device includes a medium, carrier, or form that physically prevents the conductive material from penetrating into the device. The bottom bus bar material is a sublayer of a multi-layer bus bar deposited on the top TCO. In some embodiments, the material that prevents the conductive material from penetrating into the device is deposited on the top TCO prior to applying the bus bar material on the top TCO. In some embodiments, the material that prevents the conductive material from penetrating into the device is the bus bar material that is applied on the top TCO. Examples of such materials include carbon materials including graphite and graphene, titanium oxide, tin oxide, zinc oxide, aluminum oxide, aluminum nitride, titanium nitride, tantalum nitride, chromium, a nitride, a $SiO_xN_y$ compound, and combinations thereof. These materials may be deposited as a diffusion barrier over the conductive material (e.g., silver) or, if electrically conductive, between the top TCO and the bus bar. That is, the electrically conductive diffusion barrier material is applied to the selected area, then the bus bar is applied to the electrically conductive diffusion barrier. Examples of bus bars containing a blocking medium include conductive tapes, which adhere to the device and prevent conductive material from moving into the device during cycling or operation of the electrochromic device. Example bus bars may be between about 0.5 mm to about 4 mm or between about 0.5 and about 5 mm in width. Bus bars may be about 100 microns in width. In some embodiments, bus bars may have a length of up to about 144 inches.

In another approach, the conductive bus bar material may have limited propensity for electromigration. Examples of such materials include copper, palladium, gold, nickel, iron, tin, graphite, graphene, indium, aluminum, zinc, other compounds and mixtures of these materials. In some embodiments, a bus bar may be treated with an electromigration inhibitor. One non-limiting example may be treating a copper bus bar with phosphorous to inhibit electromigration and thereby mitigate formation of shorts. In another example, plastic prestraining of the bus bar is used to introduce internal voids and/or dislocations in the bus bar material. It has been found that such voids and/or dislocations serve as internal reservoirs for migrating species and thus effectively inhibit electromigration of such species in certain solders, e.g. SnBi solder.

In some examples, one or both of the top bus bar and the bottom bus bar are non-penetrating bus bars. A penetrating bus bar is one that is typically pressed into, soldered, or sintered (e.g., a glass frit bus bar) and through one or more layers to make contact with a lower conductor, e.g. TCO located at the bottom of or below one or more layers of the EC stack). A non-penetrating bus bar is one that does not penetrate into the layers, but rather makes electrical and physical contact on the surface of a conductive layer, for example, a TCO. A solid or viscous bus bar that is either a non-penetrating or penetrating may prevent or reduce mitigation due to the form of the bus bar material.

Self-Healing Methods

This section describes procedures and materials used to "heal" small short circuits in an electrochromic device. The shorts occurring during or shortly after fabrication of the device may arise during the coating process and/or during application of the top bus bar. Healing occurs by applying a stimulus to the electrochromic device to cause a transformation that "heals" a physical condition that would otherwise constitute a short. The transformation may occur in the top TCO and/or one or more other layers in the electrochromic device; it may transform the conductive material making up the short or material surrounding the conductive material. Examples of the transformation include melting or fusing, oxidizing or reducing, or otherwise chemically degrading; mechanically severing or otherwise structurally degrading; each applying to either or both of the conductive material and the surrounding material in some cases. Another example includes activation of impurities into a lattice through exposure to radiation, such as e-beam, x-ray, laser, or other radiation. The healing mechanism may be by thermal, electrical, chemical, radiative, etc. stimulus. The stimulus may be, e.g. alternating current, heat, laser irradiation, and the like. Alternating currents for electrochromic devices are further described in U.S. patent application Ser. No. 12/336,466 filed on Dec. 16, 2008, titled "METHOD FOR REMEDYING SHORT CIRCUITS IN ELECTROCHROMIC DEVICES," which is herein incorporated by reference in its entirety.

Figure 5:
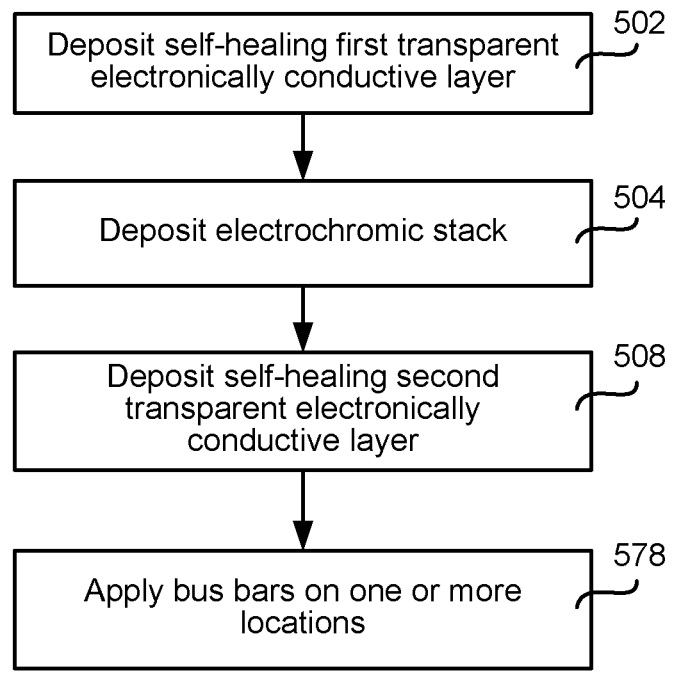

For context, FIG. 5 shows a process flow of operations for fabricating an electrochromic device with bus bars where a short in the area under the top bus bar heals. In operation 502, a first or bottom TCO is first deposited onto a glass substrate. In operation 504, the EC stack is deposited onto the bottom TCO. In operation 508, the second or top TCO is deposited on the EC stack. Operations 502, 504, and 508 form the electrochromic device. In some embodiments, the bottom TCO, the top TCO, the EC stack, or combination thereof contains a self-healing feature. For example, the bottom TCO or top TCO or both may contain a feature such that the layer is self-healing if bus bar material penetrates into it. In operation 578, bus bars may be deposited on one or more locations on the electrochromic device during post-patterning.

As explained, a bus bar conductive material such as silver ink may penetrate into depressions such as defects on the top TCO. The material may penetrate by electromigration, capillary action, pressure driven flow, gravity, or another mechanism. This effectively creates small shorts between the top TCO and the bottom TCO in the region underneath the top bus bar. In some self-healing approaches, the short is "healed" by transforming the conductive bus bar material within the short to a non-conductive or otherwise inactive state by applying a stimulus. A region of an electrochromic device that is relatively non-conductive may include small healed shorts or other small regions with non-conductive material, but the region may still tint in response to an applied potential. A region of an electrochromic device that is substantially non-conducting or substantially non-conductive resists electronic conduction and may not support electrochromic activity and/or may not support detrimental shorting (e.g., shorting that produces halos or significantly increases leakage current). A substantially non-conductive region may be a region of an electrochromic device that does not tint upon applying a potential. This stimulus or event may include physical contact with the conductive bus bar material, high current density through the short, high temperature, or another condition. In some self-healing approaches, the short is "healed" by transforming the material surrounding the conductive material in the short so that the short no longer conducts. Provided below are examples of self-healing methods for preventing or mitigating shorts.

Self-healing mechanisms may occur by a chemical reaction that inactivates a short. Healing may include contacting the conductive material of the short or a surrounding material with one or more chemicals. In various implementations, the bottom TCO heals the short upon contact with bus bar material though a defect. That is, once the bus bar material reaches and contacts the bottom TCO, due to electromigration or another mechanism, the bottom TCO "heals" the short by converting the bus bar material to a less conductive material or otherwise deactivating the bus bar material. For example, the electrical energy transferred via the short provides the stimulus for self-healing, e.g. via resistive heating in the short. In various embodiments, since the bus bar material penetrating into the bottom TCO occupies a small area (e.g., on the order of about 5 μm to about 100 um micrometers diameter or less), a small deactivated portion of the bottom TCO may not appear visible to someone viewing the device, particularly when the top bus bar is opaque or partially opaque.

Examples of chemical reactions that drive healing include chemical reactions that convert the conductive material of the bus bar into an insulting material. These reactions may be catalyzed using heat, UV, lasers, flash lamp annealing, the electrical energy running through the short itself, e.g. via resistive heating, etc. Examples include converting silver into chlorides or nitrates that are less conductive. For example, the bus bar may be made of silver with halogen or nitrate compounds in it. During normal operation of the electrochromic device, the bus bar material does not experience current spikes of the level experienced in an electrical short. Thus if an electrical short develops by electromigration of silver particles into a fissure in the device and thus spans the TCOs, the current running through the short will provide sufficient energy, e.g. heat, to convert the silver into a halide or nitrate, which is less electrically conductive, and thus the short will kill itself, i.e. self-heal. This is a radical departure from conventional wisdom which calls for cutting out/electrically isolating such shorts with laser ablation. In various embodiments, the bus bar material is chosen to have a latent chemical reactivity, where the driving force for the chemical reaction is selectively applied by a short circuit. The chemical reactants may be separate, such as conductive particles and a co-reactant in the bus bar material, or e.g., conductive particles may be chemically modified with latent co-reactants chemically bonded thereto. When the short occurs, the conductive particles self-react, self-destruct in a sense, as they lose or diminish their previous electrical conductivity properties. Thus the chemical reaction that takes place specifically is designed to destroy or inhibit the electrical conductivity of materials should those electrically conductive materials develop a short across the electrochromic device.

In some embodiments, the self-healing mechanism may be stimulated when a short under the top bus bar experiences a high current density, which melts, breaks, or otherwise degrades the conductive material in the short. Such deactivation may produce a nonconductive bus bar material, which does not participate in a short circuit and therefore reduces presence of halos on the electrochromic device. In some implementations, the short experiences a suitably high current density naturally, when a modest current flows from the top bus bar. For example, since the distance between the top bus bar and the location of the bottom TCO directly under the location of the top bus bar is the shortest distance between the top bus bar and another conductive material that is not the top TCO, small shorts in the area under the top bus bar experience a particularly high current density. This is particularly true when the short has a small diameter. Materials may be selected for the top bus bar such that if or when material from the top bus bar experiences a high current density, the bus bar material is deactivated. Examples of such materials include materials with sufficient resistance, such as polymer-based conductors. Resistance in polymer based conductors can increase with high local current densities, thereby serving to deactivate the conduction path under high local current density.

In some embodiments, the self-healing mechanism is triggered by a high temperature, which may be induced by various mechanisms including contacting or locally exposing the bus bar region with a heating element, putting the device in an oven or the other high temperature environment, irradiating the region of the bus bar with radiation absorbed by the device or a portion thereof, passing a current through the short, and the like. As an example, passing current under the top bus bar resistively heats the short or regions around it. The high temperature may cause the conductive material in the short to melt, break, chemically react to produce a non-conductive material, etc. In certain embodiments, the local temperature employed to heal shorts is the range of between about 50° C. and about 500° C., or between about 100° C. and 350° C.

In many self-healing methods, the conductive material from the bus bar penetrates into active layers of the electrochromic device under the bus bar but halos would not form. In some embodiments, self-healing methods may involve depositing a specific type of bus bar material, or depositing a specific combination of bus bar and electrochromic device layer (such as a specific bus bar and a specific bottom TCO), or treating the bus bar or electrochromic device, or combinations thereof. For example, a self-healing method may be performed by depositing a bus bar material that, upon migration into the bottom TCO, becomes nonconductive by reacting with the bottom TCO chemistry. In another example, a self-healing method may be used by fabricating an electrochromic device, applying a bus bar, and treating the bus bar, such that the treated bus bar will heal upon contact with the bottom TCO, or in high current density and/or high temperature. In some embodiments, a self-healing method may involve incorporating an additional material into bus bar, or incorporating material into the top TCO such that when the bus bar material migrates through the top TCO, the material forms a compound that is not conductive. In some embodiments, healing does not break the short circuit but rather locally deactivates the electrochromic material or other component of the electrochromic device surrounding the short, so that will current may pass through the short, it will not produce a halo.

Transparent Conductive Layer Modification

The top TCO layer may be repaired or reinforced in some embodiments to prevent or reduce formation of short circuits. As explained, fissures or other defects in the deposited top TCO layer become potential pathways for bus bar conductive materials to migrate through and therefore form short circuits in the electrochromic device. In embodiments of this section, the top TCO is modified such that bus bar material is prevented from entering defects and may not substantially migrate through the defects. A material that does not substantially migrate is a material that does not significantly move from an initially deposited location. A material that does not substantially migrate typically does not form a short. In some embodiments, a material that substantially moves from its initial location to create a short and/or degrade adjacent material. In this context, migration is a net movement of the atoms of a component, and not merely movement of ions or other charge carriers within the component. Migration may be driven by diffusion, convection, electrical fields, and the like.

Figure 6:
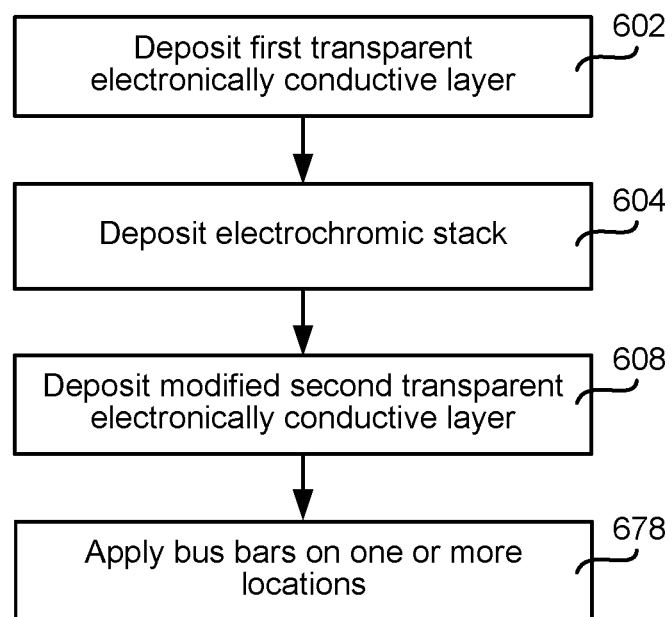

FIG. 6 is a process flow diagram of operations for fabricating an electrochromic device with a modified top TCO. In operation 602, a first or bottom TCO is deposited onto a glass substrate. In operation 604, the EC stack is deposited onto the bottom TCO. In operation 608, a modified second or top TCO is deposited on the EC stack. The modification may be performed after the top TCO is deposited or it may be performed during the TCO deposition process. Note that operations 602 and 604 may be performed using any suitable technique for depositing TCO and EC stack material to thereby form the electrochromic device. In operation 678, bus bars are applied on one or more locations on the electrochromic device during post-patterning.

One technique for repairing the top TCO to eliminate defects involves flowing material in the top TCO to close defects. The material used in this technique may be the same or different from the TCO material. In some implementations, the TCO material is reflowed by exposure to radiation (e.g., from a laser or a UV lamp); or direct heat during or after the coating process; or flash lamp annealing. In some embodiments, the TCO material is reflowed without heat, such as by using a low temperature epoxy. The process may fully or partially melt the top surface of the TCO. In certain embodiments, the reflow does not cause the electrical conductivity of the TCO to lessen, and in some cases it creates a more highly conductive TCO, e.g. by virtue of sealing previously existing voids in the TCO.

In some embodiments, the fissures may be repaired by being filled with a material other than the TCO material. Example materials include conductive or non-conductive materials, such as non-electrically conductive organic polymers. The materials may be applied e.g. by screen printing, ink jet printing (e.g. bubble jet), spraying and the like, with or without masks. In some embodiments, the material is applied as a sol-gel. The repairing process may involve coating the top TCO with the repair material to fill in the fissures, then removing the overburden or excess fill material, thereby leaving the material in the fissures only. For example, the excess material may be removed by mechanical scraping and/or grinding; polishing; and/or plasma etching. The bus bars are applied after the fissures are filled. Although the fissures are filled with insulating material and may not tint (i.e., they remain clear), these holes are in small areas and therefore may not be visible to a user. The insulative material may be applied globally or only locally, in the area(s) where the bus bar is/are to be applied.

As an alternative, the fissures may be capped with insulating or non-conductive material prior to applying the bus bars. In such embodiments, the fissures or crevices still exist, but the bus bar material is unable to penetrate into these fissures due to the presence of the cap layer. When this layer is an insulating layer, device switching relies on capacitive coupling. For example, a thin layer of silicon oxide may be deposited as a cap layer. In other embodiments, the cap layer is conductive but blocks diffusion and electromigration of the bus bar conductive material. In some embodiments, the cap is a flowable, optionally conformal, cap formed after coating the EC stack. The cap may also prevent bus bar material from entering fissures or depressions caused by defects, such as if a particle in the glass pops off after the EC stack is deposited, and the cap in some embodiments is not deposited by physical vapor deposition. The cap may be etched back or ground or polished back so as to fill (cap) the tops of the fissures, while exposing the remainder of the TCO area to have direct contact with the bus bar.

Fabrication

Electrochromic Device Fabrication Methods

Figure 7:
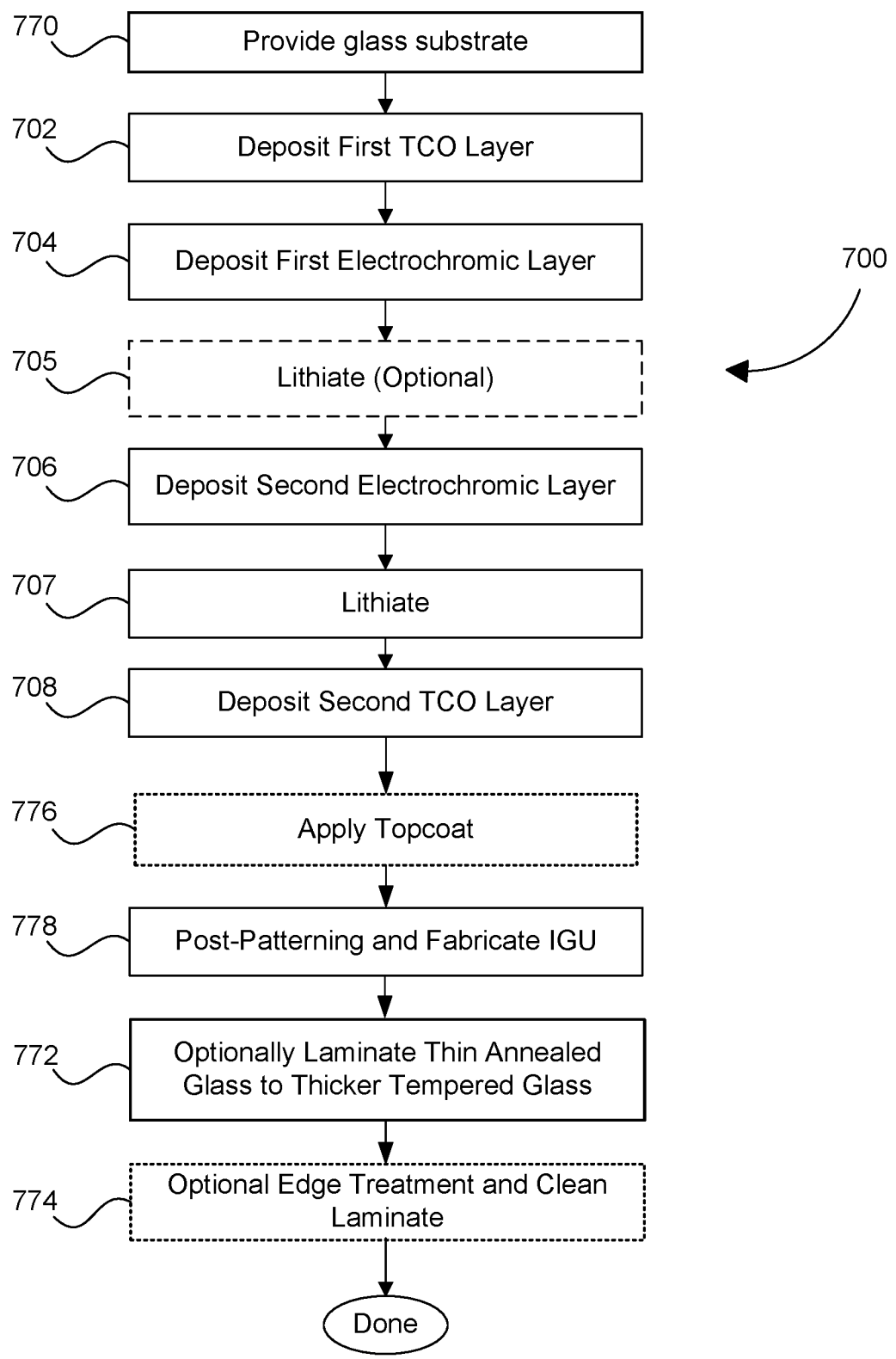
FIG. 7 is a process flow diagram depicting a method of fabricating an electrochromic window in accordance with disclosed embodiments.

FIG. 7 describes aspects of a process flow, 700, for fabricating an insulated glass unit (IGU) with an optical electrochromic device. Bus bars, device edges, and/or exposed portions of the first conductor layer may be sealed in the primary seal of the IGU. Dual electrochromic device IGU's are described in U.S. patent application Ser. No. 12/851,514 (now U.S. Pat. No. 8,270,059), filed Aug. 5, 2010, and titled "Multi-pane Electrochromic Windows," which is hereby incorporated by reference in its entirety. One embodiment is a multi-pane window as described in that application, having one or more electrochromic devices as described herein. One embodiment is any optical device described herein which does not include an inactive portion of the optical device.

In operation 770 a substrate is provided. In some embodiments, this substrate is a glass substrate. In some embodiments, the substrate is tempered or untempered float glass. The substrate may be thin flexible, low sodium glass.

Process flow 700 is described in terms of a thin flexible low-sodium glass. Although not limited in this way, these embodiments are particularly useful for applying a sputtered inorganic electrochromic device to a flexible substrate. Since flexible glass substrates may be very low defect surfaces and low-sodium, they can be excellent substrates on which to fabricate low-defect electrochromic devices. Example flexible substrates include thin and durable glass materials, such as Gorilla® Glass (e.g. between about 0.5 mm and about 2.0 mm thick) and Willow™ Glass, commercially available from Corning, Incorporated of Corning, N.Y. In one embodiment, the flexible substrate is less than 0.3 mm thick, in another embodiment the flexible substrate is less 0.2 mm thick, and in another embodiment the flexible substrate is about 0.1 mm thick. In certain embodiments, the thin flexible low-sodium substrate may be less than 0.1 mm thick.

In certain embodiments, some or all of the device fabrication operations are performed under vacuum or other controlled environmental conditions. For example, an in line fabrication process may involve passing the substrate through a series of interconnected chambers or stations, each associated with a particular process operation and each integrated with a vacuum system or other pressure control system. In some embodiments, the integrated deposition system includes a substrate holder and transport mechanism operable to hold the architectural glass or other substrate in a vertical orientation while in the plurality of deposition stations. In some cases, the integrated deposition system includes one or more load locks for passing the substrate between an external environment and the integrated deposition system. In another embodiment, the plurality of deposition stations include one or more stations for depositing any one or more of the electrochromic layer, the ion conducting layer, the defect-mitigating insulating layer, and the counter electrode layer. Sputtering or other physical vapor deposition systems may be used for depositing any one or more of the individual layers making up the electrochromic device. A sputtering system may also be used to deposit lithium on the device.

An electrochromic device is fabricated on the thin flexible glass substrate, see operations 702-708. Exemplary methods for fabricating electrochromic devices are described herein. An electrochromic device is fabricated on the thin flexible substrate as in process flow 700 described herein, but including fabrication of the first transparent conductor thereon. One embodiment is a method of fabricating an electrochromic device as described below. Note that in some embodiments, some operations of FIGS. 3, 4B, 5, and 6 may be performed during some or all operations of FIG. 7. For example, operations 302, 402, 502, and 602 may be performed in operation 702 in FIG. 7; operations 304, 404, 504, and 604 may be performed in operations 704-707; operations 308, 408, 508, and 608 may be performed in operation 708; and operations 378a, 378b, 478, 578, and 678 may be performed in operation 778.

The first and second conductor layers (e.g., the bottom and top TCO) and the one or more material layers of optical devices described herein may be all solid-state and inorganic. In certain embodiments, where the flexible glass substrate does not have a pre-applied transparent conductor thereon, the first transparent conductor (first TCO or bottom TCO layer) is applied as part of the fabrication process flow in operation 702. If the substrate as provided includes such layer, it may not be necessary to perform the operation.

The bottom TCO deposited in operation 702 includes tin oxide, e.g. fluorinated tin oxide. The bottom TCO may be deposited by various methods. In some embodiments, the bottom TCO may be deposited in accordance with operation 502 as described above with respect to FIG. 5 to form a self-healing bottom TCO.

Regardless of how the bottom TCO is formed, an EC stack may be deposited on the bottom TCO in operations 704-707. In operation 704, a first electrochromic layer is deposited on it in an operation 704. In certain embodiments, the first electrochromic layer includes a cathodic electrochromic material. In other embodiments, it includes an anodic electrochromic material.

In some cases, the substrate is heated prior to deposition of the first electrochromic material. The first electrochromic material layer is typically deposited by a process involving physical or chemical vapor deposition under vacuum or other controlled pressure. In a typical embodiment, the process involves sputtering a target containing elements contained in the electrochromic layer. However, in alternative embodiments, the electrochromic layer is deposited under ambient pressure such by a solution phase reaction.

In one implementation, the first electrochromic layer contains a cathodically tinting electrochromic material deposited in two operations, one providing a sub-layer of the base material in a first stoichiometry and the second providing another sub-layer of the base material in a second stoichiometry. As an example, the cathodically tinting electrochromic material is tungsten oxide, which has a nominal composition of $WO_x$. The first deposited sub-layer may have a composition of tungsten oxide in which the value of x is about 2.7 to 2.8 and the second deposited sub-layer may have a composition of tungsten oxide in which x is about 2.85 to 3.5. In one example, the first sub-layer is thicker; for example, it has a thickness of about 400 nm and the second sub-layer has a thickness of about 100 nm.

After the first electrochromic layer is deposited, the partially fabricated device is optionally lithiated as indicated at operation 705. The lithiation operation involves delivery of lithium metal or lithium ions into the first electrochromic layer. The lithium may be provided by sputtering or other suitable process. Certain aspects of lithium deposition and the targets used in lithium deposition processes are described in International Application No. PCT/US2012/034556, filed Apr. 20, 2012 (designating the US) and in International Application No. PCT/US2012/042514, filed Jun. 14, 2012 (designating the US), both of which are incorporated herein by reference in its entirety.

The next operation in fabrication process 700 involves depositing a second electrochromic layer (an example of the counter electrode layer generally described above) in operation 706. As with the deposition of the first electrochromic layer, this deposition process may be accomplishing using, e.g., physical or chemical vapor deposition. If the first electrochromic layer contains a cathodically tinting electrochromic material, then the second electrochromic layer may contain an anodically tinting electrochromic material. The opposite is also true. If the first electrochromic layer contains an anodically tinting electrochromic material, the second electrochromic layer may contain a cathodically tinting electrochromic material. In certain embodiments, the second electrochromic layer contains an anodically tinting electrochromic material such as nickel oxide or tungsten doped nickel oxide (sometimes referred to as NiWO). In some examples, where nickel tungsten oxide serves as the second electrochromic layer, it is formed to a thickness of between about 200 and 300 nm. In some cases, only one electrochromic layer is used. Ions are shuttled into and out of the single electrochromic layer, from and to a non-electrochromic counter electrode. In the example of FIG. 7, no ion conducting layer is separately deposited between the first and second electrochromic layer.

After the second electrochromic layer is deposited, the device, which includes the first and second electrochromic layers, is lithiated as indicated in operation 707. The lithiation may be accomplished as described in the context of operation 705. As mentioned, lithiation operations may promote ejection of particles previously embedded in the partially fabricated electrochromic device stack. While not depicted in the process flow of FIG. 7, an insulating protective layer may be deposited after any of the steps that promote ejection of particles. Therefore, in certain embodiments, the deposition of the protective insulating layer may be performed after lithiation operation 705 or lithiation operation 707.

Returning to the process flow depicted in FIG. 7, after the lithiation of the device in 707, the next process operation deposits a second or top TCO layer as depicted in an operation 708. At this point, all structures needed for the basic electrochromic device have been created. In some embodiments, a self-healing top TCO is deposited in this operation in accordance with operation 508 as described above with respect to FIG. 5. In some embodiments, a modified top TCO layer deposited in operation 708 is deposited in accordance with operation 608 as described above with respect to FIG. 6.

In certain embodiments, one or more coating layers as described may be formed on a substrate (e.g., glass sheet) in an integrated deposition system where the substrate does not leave the integrated deposition system at any time during fabrication of the layer(s). In one embodiment, an electrochromic device including an EC stack and a top TCO may be fabricated in the integrated deposition system where the glass sheet does not leave the integrated deposition system at any time during fabrication of the layers. In one case, the bottom TCO layer may also be formed using the integrated deposition system where the glass sheet does not leave the integrated deposition system during deposition of the EC stack, and the TCO layer(s). In one embodiment, all of the layers (e.g., diffusion barrier, bottom TCO, EC stack, and top TCO) are deposited in the integrated deposition system where the glass sheet does not leave the integrated deposition system during deposition.

A top coat is optionally applied to the electrochromic device to protect it in operation 776. A top coat may be added as an encapsulant, e.g., as a hermetic seal to protect the laminate from the ambient. In certain embodiments, the encapsulant also serves as an edge adhesive as described herein. For example, in one embodiment, the encapsulant is a parylene, e.g. parylene AF-4 (a para-xylylene derivative which is also Teflon derivative). In another embodiment, the top coat is a silicone or epoxy based encapsulant such as those commercially available from e.g. Polysciences, Inc. of Warrington, Pa. or those available from Dow Corning Corporation, of Midland, Mich. These encapsulants can also be adhesives, therefore in certain embodiments the top coat procedure also protect the edges of the annealed thin glass, and thus is used in lieu of, or in addition to, edge treatments. Edge treatments may be similar to edge treatments described above with respect to operation 774. In one embodiment, the process flow 700 does not include edge treatment, but rather the top coat application, 776, is all that is necessary to protect the edges of the thin annealed glass substrate (as well as the electrochromic device as a whole). In other embodiments, one or more edge treatments as described herein are combined with the topcoat for a more robust laminate that can withstand temperature changes as well as ambient exposure and impact.

In operation 778, after coating the substrate, the substrate may undergo post-patterning, which includes application of bus bars, cutting of the coated substrate, and fabrication of the IGU. Examples of suitable post-treatment include thermal and/or chemical conditioning operations. Such operations are described in U.S. patent Ser. No. 12/645,111, incorporated herein by reference. In some embodiments, the post-patterning may include locally deactivating areas of the electrochromic device as described above with respect to operation 378a in FIG. 3 and applying bus bars in operation 378b. In some embodiments, post-patterning may include applying a non-liquid bus bar in accordance with operation 478 of FIG. 4B.

Fabrication of the bus bars on the second or first TCO layer may be performed before cutting the substrate. In some embodiments, a single glass unit is fabricated with multiple transparent bus bars may be applied on the second TCO to enable faster switching. By placing bus bars in the interior region of a window, which may be a region visible to a building occupant, the distance between bus bars is reduced, thereby minimizing the ohmic potential drop in the region between the outer bus bars.

Electrochromic devices may have two bus bars, one for each transparent conducting layer. However, methods herein also include fabrication of devices having more than one bus bar for each transparent conducting layer, specifically bus bars on opposing sides of each of the first and second conductor layer. This may be particularly useful when fabricating larger electrochromic devices that would otherwise use longer switching times due to the sheet resistance and having large-area devices.

Bottom bus bars may be applied by first exposing a portion (bus bar pad expose, or "BPE") of the first conductor or bottom TCO layer. The BPE need not run the entire length of that side, it need only be long enough to accommodate the bus bar and leave some space between the bus bar and the second conductor layer so as not to short on the second conductor layer. In one embodiment, the BPE spans the length of the bottom TCO layer on that side.

As described above, in various embodiments, a BPE is where a portion of the material layers are removed down to the lower electrode or other conductive layer (e.g. a transparent conducting oxide layer), in order to create a surface for a bus bar to be applied and thus make electrical contact with the electrode. The bus bar applied can be a soldered bus bar, ink bus bar, solid bus bar, viscous bus bar, or the like. A BPE typically has a rectangular area, but this is not necessary; the BPE may be any geometrical shape or an irregular shape. For example, depending upon the need, a BPE may be circular, triangular, oval, trapezoidal, and other polygonal shapes. The shape may be dependent on the configuration of the electrochromic device, the substrate bearing the electrochromic device (e.g. an irregular shaped window), or even, e.g., a more efficient (e.g. in material removal, time, etc.) laser ablation pattern used to create it. In one embodiment, the BPE spans at least about 50% of the length of one side of an electrochromic device. In one embodiment, the BPE spans at least about 80% of the length of one side of an electrochromic device. In one embodiment, the BPE is substantially rectangular, the length approximating one side of the electrochromic device and the width is between about 5 mm and about 15 mm, in another embodiment between about 5 mm and about 10 mm, and in yet another embodiment between about 7 mm and about 9 mm. As mentioned, a bus bar may be between about 1 mm and about 5 mm wide, typically about 3 mm wide.

As mentioned, in some embodiments, the BPE is fabricated at any suitable width or at any desired location since the bus bar can be deposited on active material. The bus bar width may exceed that of the BPE (and thus there is bus bar material touching both the lower conductor and glass (and/or diffusion barrier)). In embodiments where the bus bar width is fully accommodated by the BPE, that is, the bus bar is entirely atop the lower conductor, the outer edge, along the length, of the bus bar may be aligned with the outer edge of the BPE, or inset by about 1 mm to about 3 mm. Likewise, the space between the bus bar and the electrochromic device is between about 1 mm and about 3 mm, in another embodiment between about 1 mm and 2 mm, and in another embodiment about 1.5 mm. Formation of BPEs is described in more detail below, with respect to an electrochromic device having a lower electrode that is a TCO. This is for convenience only, the electrode could be any suitable electrode for an optical device, transparent or not.

To make a BPE, an area of the bottom TCO is cleared of deposited material so that a bus bar can be fabricated on the bottom TCO. In one embodiment, this is achieved by laser processing which selectively removes the deposited film layers while leaving the bottom TCO exposed in a defined area at a defined location. In one embodiment, the absorption characteristics of the bottom electrode and the deposited layers are exploited in order to achieve selectivity during laser ablation, that is, so that the EC materials on the TCO are selectively removed while leaving the TCO material intact. In certain embodiments, an upper portion (depth) of the TCO layer is also removed in order to ensure good electrical contact of the bus bar, e.g., by removing any mixture of TCO and EC materials that might have occurred during deposition.

In certain embodiments, the electromagnetic radiation used to fabricate a BPE is the same as for performing edge deletion. The (laser) radiation is delivered to the substrate using either optical fiber or the open beam path. The ablation can be performed from either glass side or the film side depending on the choice of the electromagnetic radiation wavelength. The energy density used to ablate the film thickness is achieved by passing the laser beam through an optical lens. The lens focuses the laser beam to the desired shape and size, e.g. a "top hat" having the dimensions described above, in one embodiment, having an energy density of between about 0.5 J/cm² and about 4 J/cm². In one embodiment, laser scan overlapping for BPE is done as described above for laser edge deletion. In certain embodiments, variable depth ablation is used for BPE fabrication. This is described in more detail below.

In certain embodiments, e.g. due to the selective nature of the absorption in an EC film, the laser processing at the focal plane results in some amount (between about 10 nm and about 100 nm) of residue, e.g. tungsten oxide, remaining on the exposed area of the lower conductor. Since many EC materials are not as conductive as the underlying conductor layer, the bus bar fabricated on this residue does not make full contact with the underlying conductor, resulting in voltage drop across the bus bar to lower conductor interface. The voltage drop impacts tinting of the device as well as impacts the adhesion of the bus bar to the lower conductor. One way to overcome this problem is to increase the amount of energy used for film removal, however, this approach results in forming a trench at the spot overlap, unacceptably depleting the lower conductor. To overcome this problem the laser ablation above the focal plane is performed, i.e. the laser beam is defocused. In one embodiment, the defocusing profile of the laser beam is a modified top hat, or "quasi top hat." By using a defocused laser profile, the fluence delivered to the surface can be increased without damaging the underlying TCO at spot overlap region. This method minimizes the amount of residue left in on the exposed lower conductor layer and thus allows for better contact of the bus bar to the lower conductor layer.

After forming the BPE, bus bars are applied to the device, one on exposed area BPE of the bottom TCO layer (e.g., first TCO) and one on the opposite side of the device, on the top TCO layer (e.g., second TCO), on a portion of the second conductor layer that is not above the first conductor layer. In some embodiments, bus bars applied on the top TCO are fabricated at a width and at a location of an area where the electrochromic device was deactivated after the electrochromic device coating was completed. Bus bars deposited on the top TCO may have dimensions such that the length is between about 10" and about 144", the width is between about 0.5 mm and about 5 mm, and the thickness is between about 10 um and 1000 um.

After the bus bars are fabricated or otherwise applied to one or more conductive layers, the electrochromic lite, with or without lamination to another lite, may be integrated into an IGU, which includes, for example, wiring for the bus bars and the like. In some embodiments, one or both of the bus bars are inside the finished IGU. In particular embodiments, both bus bars are configured between the spacer and the glass of the IGU (commonly referred to as the primary seal of the IGU); that is, the bus bars are registered with the spacer used to separate the lites of an IGU. An area of the device that has been patterned to remove device layers may be used, at least in part, to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer. Particular methods and apparatus for achieving this end are described in U.S. patent application Ser. No. 13/312,057 (now U.S. Pat. No. 8,711,465), filed Dec. 6, 2011, and titled "IMPROVED SPACERS FOR INSULATED GLASS UNITS," which is hereby incorporated by reference in its entirety. In certain embodiments described herein, methods and resulting IGUs include having the perimeter edge of the electrochromic device, bus bars and any isolation scribes are all within the primary seal of the IGU.

Referring to FIG. 7, in operation 772, the substrate may be laminated to a support lite, e.g. a tempered or heat strengthened lite, between about 3 mm and about 25 mm thick, in another embodiment between about 3 mm and about 12 mm thick, and in yet another embodiment between about 3 mm and about 6 mm thick. The glass may be laminated to a tempered glass or heat strengthened glass lite; however, that is only one embodiment of the lamination portion of the process flow. For example, a thin flexible glass can be laminated to a plastic substrate. In certain embodiments, a thin flexible substrate is laminated to a non-annealed glass lite, e.g. a tempered or heat strengthened glass lite or another thin flexible glass.

The laminate formed in operation 772 should have a uniform surface, e.g., the lamination adhesive should be uniformly distributed, both in thickness and devoid of bubbles, between the tempered lite and the flexible annealed glass substrate. Having a uniform (e.g. substantially planar) surface on the flexible substrate allow layers to be more uniform when subsequently deposited. For an absorptive device, e.g., the lamination adhesive should have good clarity, low haze, and sufficient light transmission for the ultimate optical device's specifications. The lamination layer can be colored, or not, depending on the need. A colored lamination layer can be used to offset unwanted color in another part of the optical device, or used to enhance an existing color. If yellowing of the lamination adhesive occurs during processing, the support lite color may be chosen to make the final product's color space conform to specification. Dyes that may be used in the lamination layer are preferably highly stable to heat and ultraviolet (UV) radiation. If inorganic pigments are chosen, they should not catalyze breakdown of the lamination adhesive under heat or UV. In one embodiment, the lamination adhesive is formulated to have lateral give, so that the difference in the coefficient of thermal expansion between the support lite and the thin flexible lite is accommodated without breakage due to thermal shock.

Referring again to process flow 700 in FIG. 7, an edge treatment is optionally applied to the laminate, see 774. An edge treatment may include a grinding and/or polishing procedure to improve the edge strength or more fully protect and/or secure the edge of the thin flexible substrate. In one embodiment, the edge of the thin flexible glass partner is heated to high temperature to melt the glass around the perimeter, thereby removing microfissures and inducing stress in the edge for added strength. In one embodiment, the flexible thin annealed glass' edge is ground and/or polished after lamination, e.g. the laminate is a "rough cut" laminate, e.g. mechanically cut, that is put through an edge grind and polish process to strengthen the edge of the thin annealed lite (the tempered light typically will already have a ground and polished edge). In the resulting structure, although the area ("footprint") of the tempered support lite and the thin flexible lite are the same, the outermost edge of the thin glass is beveled, e.g. to approximate the curvature of the tempered lites ground (and optionally polished) edge.

The lamination is carried out in a clean, low-particulate environment. However, since the optical device fabrication occurs after lamination, the laminate may optionally be cleaned prior to, e.g. electrochromic device fabrication, see 774. Cleaning is performed, e.g., using commercially available glass cleaning apparatus.

The laminate is optionally incorporated into an IGU. Since methods described herein may produce a strong laminate, incorporation into an IGU is optional. The laminate may be further strengthened by laminating another tempered, heat strengthened or polymeric lite to the electrochromic device in order to protect the flexible annealed lite and/or the electrochromic device from impact.

In one embodiment, the laminate is incorporated into an IGU, where the optical device, e.g. an electrochromic device, is in the interior volume of the IGU. This may be done before or after excising the laminates from the bulk sheet. In such embodiments, the electrochromic device may or may not have a topcoat and/or extra lite laminated to the electrochromic device side, because the interior volume protects the electrochromic device. In one embodiment the laminate does include a topcoat and is also incorporated into an IGU where the electrochromic device is within the interior volume of the IGU. This construction is useful, e.g., if the IGU's interior-proximate pane and/or the primary and secondary seals should fail, the electrochromic device will be protected from the ambient by the topcoat. The IGU may have only a single laminate as described herein, e.g. a double pane IGU where the mate lite of the IGU is a single glass lite. In other embodiments, the IGU is a double pane construct with two laminates as described herein serving as the two panes of the IGU. Triple pane IGU's are also within the scope of the embodiments described herein, with one, two, or three laminates as described herein.

"Coat-then-cut" methods allow for high throughput manufacture because a plurality of electrochromic devices can be fabricated on a single large area substrate, as well as tested and defect-mitigated prior to cutting the large format glass sheet into individual lites. In one embodiment, the large format glass pane is laminated with individual strengthening panes registered with each electrochromic device prior to cutting the large format sheet. The bus bars may or may not be attached prior to lamination; for example, the mate lite may be coextensive with an area allowing some exposed portions of the top and bottom TCO's for subsequent bus bar attachment. In another example, the mate lite is a thin flexible material, such as a thin flexible glass, which is substantially co-extensive with the electrochromic device or the entire large format sheet. The thin flexible mate lite is ablated (and lamination adhesive, if present in these areas) down to the first and second conductor layers so that bus bars may be attached to them as described herein. In yet another embodiment, the thin flexible mate lite, whether co-extensive with the entire large format sheet or the individual electrochromic devices, is configured with apertures which are registered with the top conductor layer and the BPE during lamination. The bus bars are attached either before or after lamination with the mate lite, as the apertures allow for either operation sequence. The lamination and bus bar attachment may separately be performed prior to cutting the large sheet, or after.

In certain embodiments, when laminating, bus bar may be applied prior to lamination, where the bus bar is applied to the BPE and upper TCO, then pressed out from between these areas when laminated, e.g. to an aperture in the mate lite or continuing around the edge of the laminate, to allow lead attach at a point located outside the laminated area. In another embodiment, a flat foil tape is applied to the top conductor and the BPE, the foil tape extends beyond the laminated region, such that wires can be soldered to the tape after lamination. In these embodiments, cutting must precede lamination unless, e.g., the lamination mate lites do not cover the entire surface of the large format substrate (e.g. as described in relation to roll-to-roll embodiments herein).

Lites, laminated or not, may be incorporated into an IGU. In one embodiment, the individual EC lites are incorporated into an IGU and then one or more of the EC lites of the IGU is laminated with a strengthening pane (mate lite) as described herein or in U.S. Pat. No. 8,164,818. In other embodiments, e.g. as described herein, lamination may include a flexible substrate, e.g. the aforementioned lamination of an IGU where the mate lite is a flexible substrate, or e.g., lamination of the EC lite directly to a flexible substrate. Further such embodiments are described in relation to FIG. 8.

Apparatus for Electrochromic Device Fabrication

Figure 8:
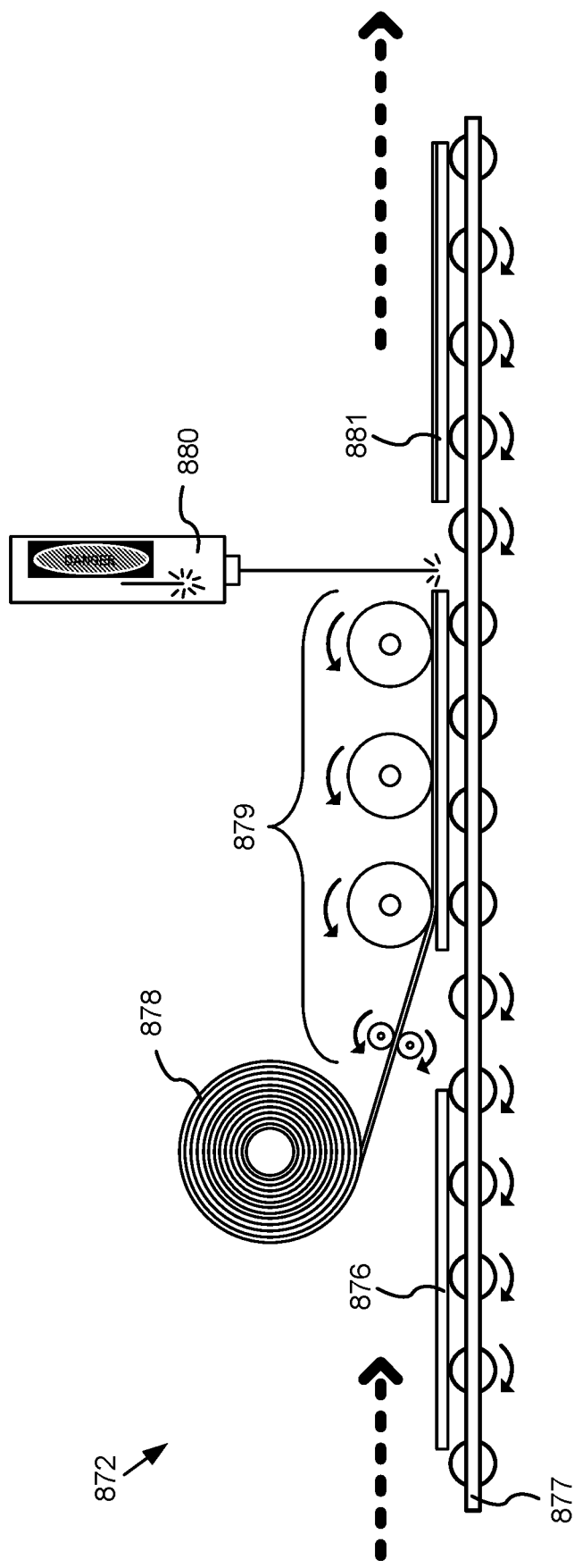
FIG. 8 is a schematic representation depicting roll-to-roll processing of electrochromic devices.

FIG. 8 depicts roll-to-roll processing, 872, forming laminates of electrochromic devices where the lamination uses a mate lite, the mate lite may be a tempered lite for added support or a flexible thin glass or even an IGU. A substrate, 876, is fed into a lamination line, in this example including a conveyer 877. Substrate 876 may be an IGU with at least one EC lite incorporated, or substrate 876 can be a monolithic electrochromic device, e.g., as described herein or substrate 876 can be a large format substrate with a plurality of EC lites fabricated thereon. In some embodiments, the substrate 876 may be an IGU fabricated in accordance with process 700 in FIG. 7. In some embodiments, substrate 876 is a glass substrate to be laminated in operation 772 of FIG. 7. The term "substrate" as used in this discussion with respect to FIG. 8 includes an optical coating electrochromic device. Such substrates can be used in roll-to-roll processing. Flexible, thin and durable glass materials may be used during lamination such as Gorilla® Glass (e.g. between about 0.5 mm and about 2.0 mm thick) and Willow™ Glass, commercially available from Corning, Incorporated of Corning N.Y.

In this example, a thin and flexible substrate 878, such as a glass substrate, is fed from a roll into the lamination line. In one embodiment, one or more rolls are applied in parallel to a large format glass sheet including a plurality of electrochromic devices (substrate 876 may itself be a thin flexible glass in a roll format, i.e. that has been coated with the electrochromic device coating and post-patterned and processed as described herein). For example, three separate and parallel rolls of the flexible substrate are fed into a lamination line that laminates the large format glass substrate lengthwise or widthwise such that three columns or rows of electrochromic devices are each laminated with the flexible substrate. Thus using roll-to-roll processing, large format glass sheets can be laminated with flexible mate lite material and cut into individual EC lites. The large format glass sheet may be cut as each row is laminated or after the entire sheet is laminated. In certain embodiments, individual EC lites, or IGU's containing them, are laminated with roll-to-roll processing.

An adhesive is applied to substrate 876, flexible substrate 878, or both. Rollers 879 apply sufficient pressure to ensure good bonding between substrate 876 and flexible substrate 878. Flexible substrate 878 is cut to match its lamination partner 876, e.g., using a laser 880. The final laminate structure 881 results. Using this roll-to-roll method, monolithic electrochromic devices, IGU's or large format glass sheets bearing a plurality of EC lites can be strengthened with a thin flexible strengthening pane or, e.g. thin flexible EC lites can be strengthened with another thin flexible glass laminate partner. These methods apply to any EC substrate, described herein or otherwise. In one embodiment, the monolithic EC lites, e.g. having been cut from the large area substrate, are fed into the lamination line to be laminated with the flexible substrate. In another embodiment, the large area substrate, having a plurality of electrochromic devices fabricated thereon, is laminated with a flexible substrate of corresponding width, and after lamination, the individual, now laminated, electrochromic devices are cut from the large area laminate, e.g., by row as lamination finishes or after lamination of the entire large format sheet. In another embodiment, the large area substrate, having a plurality of electrochromic devices fabricated thereon, is laminated with a plurality of flexible substrates of corresponding width or length to individual EC lites, and after lamination, the electrochromic devices, now laminated, are cut from the large area laminate, e.g. individually, or by row (or column).

In certain embodiments, a large format annealed glass, e.g. thin flexible glass, is coated with an electrochromic device coating, e.g. as described herein, in one facility and then post-processing is performed in another facility. For example, embodiments described herein provide examples where patterning of individual electrochromic devices may be done post-deposition to address any issues of shorting under the top bus bar. Thus large sheets of glass can be coated with the device coating, stored, and/or shipped to another facility for post-processing into daughter lites. In this way, e.g., a manufacturer can produce as its product large format glass coated with a monolithic electrochromic device coating. The coated glass may be large sheets or large rolls of flexible glass. The coated glass can be mass produced and stored or shipped to customers who can post-process the coated glass as they desire. In some embodiments, the methods described herein are used to post-process the coated glass into a plurality of electrochromic devices or lites, which in turn can be made into laminates and/or IGUs. The coated glass may have a hermetic protective layer as described herein. Methods described herein provide for great flexibility in post-processing without pre-patterning of the devices.

Embodiments described herein, e.g. not requiring pre-patterning of the electrochromic devices on the large format glass, provides great flexibility in how such large scale coated sheets are post-processed. For example, bus bar placement and EC device configurations are decided downstream, after the electrochromic coating process.

"Coat, ship and then cut" methods provide further advantages in manufacturing flow. For example, an electrochromic device coated annealed glass can be loaded into e.g. large shipping racks rather than having to manufacture and load finished IGUs and/or laminates. Huge money savings are realized due to drastic reductions in plant complexity, and cost reductions in shipping volume and weight (freight charges). Further, diversity in post-processing is accommodated because post-processing is done locally at the downstream factory. Thus a single product of electrochromic device coated glass can be shipped to multiple sites for various custom post-processing. Having centralized coating facilities and satellite post-processing facilities improves quality and consistency of the product and downstream products, because the electrochromic device coating process is highly focused and a highly skilled workforce is used relative to downstream post-processing. Downstream customers, e.g. IGU fabricators, have more control over their manufacturing, and this allows end customers (the window buyer) more choice in custom designs and quality. Also, decentralizing the fabrication process allows for fabricating the most important part of the windows where there is a reliable power supply for the large scale coaters, thus supply interruptions are avoided and proximity to large scale shipping hubs may not be as crucial (since the shipments are lighter and take less volume per square foot of device shipped).

In certain embodiments a top coat, e.g. a hermetic sealing layer used to provide hermetic protection, is applied to the electrochromic device coating. The coating provides a hermetic seal to protect the coating during shipment, e.g. in "coat, ship and then cut" embodiments. This top coat may be applied by various techniques, e.g. spray coat, dip coat, and the like. This top coat protects the device coating from moisture that might otherwise destroy device function if e.g. there are fissures in the top TCO or otherwise the top TCO is itself does not provide a moisture barrier between the ambient and the EC stack. This top coat may be applied, e.g. immediately or shortly after the electrochromic device coating is applied. For example, large sheets of coated glass or a continuous sheet of glass coated with an electrochromic device, may pass in front of, under or over a spray apparatus and a drying station, e.g. an oven. In this way moisture free device coating is immediately sealed and protected from the ambient. This may protect from pinhole formation in certain instances. Also, electrochromic device coatings can often be susceptible to scratches, which may impair function and/or aesthetics, e.g. switching uniformity. The top coat protects this. And, having the coating protected from the ambient allows for more flexibility in handling, providing more time to inspect, pack, store and ship the product, i.e. the queue time control in expanded and made more flexible. A hermetic top coat may be permanent or temporary, e.g. a film that is removed downstream, e.g. at a separate post-processing facility.

In the alternative, or in addition to a top coat, the electrochromic device coated glass sheets or rolls may be handled, processed, and/or shipped in an atmospherically controlled environment, e.g. a dry environment and/or inert gas environment. Also, the electrochromic device coated sheets or rolls may be protected with e.g. an interleaving sheet, powder, or similar temporary protectant as is known in the glass industry. A suitable interleaving sheet may be a highly polished paper, such as a rice paper. Example interleaving powders may also be used, such as those available from Chemetall Group of New Providence, N.J. and also include those described in "How to Prevent Glass Corrosion" by Duffer, Paul F., GLASS DIGEST, Nov. 15, 1986. A wide range of interleaving sheets may be used and range from kraft paper to highly technical pH balance materials. A powder may include a type of bead such as an acrylic or ultra high molecular weight (UHMW) bead, and an acidic component that prevents staining, such as adipic acid.

In certain embodiments, "coat, ship and then cut" methods can be augmented by using a temperable electrochromic device coating and/or by providing the coating as a device precursor which is converted into the functional EC device as part of the post-processing. Temperable electrochromic devices are described in U.S. patent application Ser. No. 13/137,750, filed on Dec. 20, 2013, titled "TEMPERABLE ELECTROCHROMIC DEVICES," which is incorporated by reference herein for all purposes. Electrochromic device precursors are described in U.S. Pat. No. 8,300,298, issued on Oct. 30, 2012, titled "ELECTROCHROMIC DEVICES," which is incorporated by reference herein for all purposes. Both of these technologies allow for application of a series of layers to the glass, where they do not function as an electrochromic device. These layers are later heated or have other energy sources applied to them, which energy converts the layers into a functional electrochromic device coating. Temperable electrochromic device coatings may or may not be functional devices prior to the heat treatment, in this case tempering of the annealed glass.

For example, annealed glass is coated with an electrochromic device precursor coating or a temperable electrochromic device coating. The glass can then be shipped to various facilities for post-processing. In one embodiment, the coated glass includes an electrochromic device precursor coating. As part of the post-processing, the coating is exposed to energy, e.g. heat, in order to convert the device precursor coating into a functional electrochromic device coating. This has the advantage of even further flexibility in post-processing, e.g. individual post-processors can decide on optimal conditions for electrochromic device conversion. In the case of electrochromic device precursor coating conversion to functional electrochromic device coating, the glass may be cut into daughter lites or devices before or after the heating process. In another example, a temperable electrochromic device coating is applied to annealed glass (thick enough to be tempered). As part of the post-processing, the coating is exposed to energy, e.g. heat, in order to temper the glass substrate and optionally convert the device precursor coating into a functional electrochromic device coating (unless it is already a functional device coating that can withstand the tempering process). This has the advantage of even further flexibility in post-processing, e.g. individual post-processors can decide on optimal conditions for tempering and/or electrochromic device conversion. In the case of a temperable EC coating, the glass would be cut into daughter lites or devices before tempering.

In some embodiments, a glass substrate including a first transparent, electronically conductive layer may be made planar by polishing the substrate. Examples of polishing substrates are further described in U.S. Pat. No. 9,007,674, issued on Apr. 14, 2015, titled "DEFECT-MITIGATION LAYERS IN ELECTROCHROMIC DEVICES;" PCT International Application No. PCT/US2015/26150, filed on Apr. 16, 2015, titled "PARTICLE REMOVAL DURING FABRICATION OF ELECTROCHROMIC DEVICES;" and PCT International Application No. PCT/US2012/57606, filed on Sep. 27, 2012, titled "OPTICAL DEVICE FABRICATION," all of which are herein incorporated by reference in their entireties. A planar electrochromic device coating may prolong the duration in which the electrochromic device coating can withstand exposure to atmospheric moisture.

In some embodiments, the first transparent, electronically conductive layer may be deposited as a planar layer. For example, in some embodiments, a transparent conductive layer may be deposited by methods such as PVD. Such films deposited by PVD may be deposited as amorphous and then crystalized such that the resulting film tends to be smoother than ones deposited in crystalline form. This is mainly driven by deposition temperature.

A planar glass substrate including the electrochromic stack may be capable of withstanding a longer duration of exposure to atmospheric moisture. Planar may be defined as having a peak-to-peak roughness of less than about 30 nm, or less than about 15 nm, or less than about 10 nm.

CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Accordingly, the present embodiments are to be considered as illustrative and not restrictive, and the embodiments are not to be limited to the details given herein.

The invention claimed is:

1. A method of fabricating an electrochromic device comprising an electrochromic stack between a first and a second transparent, electronically conductive layer configured to establish an electrical potential across the electrochromic stack and thereby cause optical switching of the electrochromic device, the method comprising:
  (a) receiving a substrate with the first transparent, electronically conductive layer disposed on a surface of the substrate;
  (b) fabricating the electrochromic stack on the first transparent, electronically conductive layer, wherein the electrochromic stack comprises an electrochromic layer and a counter electrode layer;
  (c) forming the second transparent, electronically conductive layer on the electrochromic stack;
  (d) forming a bus bar on a region of the second transparent, electronically conductive layer, wherein the region is over the first transparent, electronically conductive layer; and
  (e) after fabricating the electrochromic stack and the second transparent, electronically conductive layer,
    (i) deactivating the electrochromic device in the region under the bus bar without substantially deactivating the electrochromic device in regions not under the bus bar, or (ii) activating the electrochromic device in the regions not under the bus bar without substantially activating the electrochromic device in the region under the bus bar.

2. The method of claim 1, wherein (e) is performed prior to performing (d).

3. The method of claim 1, further comprising continuously feeding the substrate from a roll of the substrate to an apparatus that coats the electrochromic stack on the substrate.

4. The method of claim 3, wherein the substrate comprises a flexible glass.

5. The method of claim 1, further comprising forming the first transparent, electronically conductive layer on the surface of the substrate.

6. The method of claim 5, wherein forming the first transparent, electronically conductive layer, fabricating the electrochromic stack, and forming the second transparent, electronically conductive layer are performed sequentially in a sputter coating apparatus, which coats the surface of the substrate with the first and the second transparent, electronically conductive layers and the electrochromic stack.

7. The method of claim 1, further comprising cutting the substrate to provide multiple lites prior to (d) or (e).

8. The method of claim 1, wherein operations (b) and (c) are performed sequentially in a sputter coating apparatus, which coats the surface of the substrate with the first and the second transparent, electronically conductive layers and the electrochromic stack, and wherein operation (d) is performed outside the sputter coating apparatus.

9. The method of claim 1, wherein the method is performed without isolating a region of the first transparent, electronically conductive layer before forming the second transparent, electronically conductive layer.

10. The method of claim 1, wherein the method is performed without isolating a region of the electrochromic stack before forming the second transparent, electronically conductive layer.

11. The method of claim 1, wherein the method is performed without pre-defining where the bus bar for the second transparent, electronically conductive layer will be formed prior to completing the electrochromic device and the second transparent, electronically conductive layer.

12. The method of claim 9, further comprising forming one or more additional bus bars on the second transparent, electronically conductive layer and/or the first transparent, electronically conductive layer.

13. The method of claim 12, further comprising cutting the substrate to provide multiple lites.

14. The method of claim 1, wherein fabricating the electrochromic stack comprises depositing lithium on the counter electrode layer and/or the electrochromic layer.

15. The method of claim 1, wherein the deactivating in (e) comprises preventing lithiation of the electrochromic device in the region under the bus bar.

16. The method of claim 1, wherein the electrochromic layer comprises electrochromic metal oxide, and wherein the deactivating in (e) comprises reacting interstitial oxygen in the electrochromic layer with the electrochromic metal oxide to produce a stoichiometric or oxygen rich form of the metal oxide which is not electrochromically active.

17. The method of claim 1, wherein the deactivating in (e) comprises applying excess oxygen in the region under the bus bar.

18. The method of claim 1, wherein (e) comprises:
(i) during operation (b) and/or (c), sensitizing the electrochromic stack, the first transparent, electronically conductive layer, and/or the second transparent, electronically conductive layer; and
(ii) after operation (c), locally applying a stimulus under or proximate the bus bar to either deactivate the sensitized electrochromic stack, the first transparent, electronically conductive layer, and/or the second transparent, electronically conductive layer in the region under the bus bar or activate the sensitized electrochromic stack, the first transparent, electronically conductive layer, and/or the second transparent, electronically conductive layer in the regions not under the bus bar.

19. The method of claim 18, wherein the sensitizing comprises a treatment selected from the group consisting of applying heat, irradiating, applying a chemical or composition, and combinations thereof.

20. The method of claim 18, wherein the stimulus is selected from the group consisting of irradiation, heating, exposure to chemical or composition, and combinations thereof.

* * * * *